United States Patent
Lee et al.

(10) Patent No.: US 9,639,251 B2
(45) Date of Patent: May 2, 2017

(54) MOBILE TERMINAL AND METHOD OF CONTROLLING THE MOBILE TERMINAL FOR MOVING IMAGE PLAYBACK

(71) Applicant: LG ELECTRONICS INC., Seoul (KR)

(72) Inventors: Jungbin Lee, Seoul (KR); Miran Han, Seoul (KR); Seulah Lee, Seoul (KR); Jeongyoon Rhee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 181 days.

(21) Appl. No.: 14/147,906

(22) Filed: Jan. 6, 2014

(65) Prior Publication Data

US 2015/0019969 A1 Jan. 15, 2015

(30) Foreign Application Priority Data

Jul. 11, 2013 (KR) .................. 10-2013-0081695

(51) Int. Cl.
| | | |
|---|---|---|
| *G06F 3/0484* | (2013.01) | |
| *G06F 17/30* | (2006.01) | |
| *G10L 15/26* | (2006.01) | |
| *G11B 27/34* | (2006.01) | |
| *G11B 27/00* | (2006.01) | |

(Continued)

(52) U.S. Cl.
CPC .... *G06F 3/04842* (2013.01); *G06F 17/30746* (2013.01); *G06F 17/30787* (2013.01); *G06F 17/30796* (2013.01); *G10L 15/26* (2013.01); *G10L 15/265* (2013.01);

(Continued)

(58) Field of Classification Search
CPC .................................. G06F 3/04842
See application file for complete search history.

(56) References Cited

U.S. PATENT DOCUMENTS 6,785,649 B1 * 8/2004 Hoory ..................... G10L 13/08
704/235
8,543,396 B2 * 9/2013 Terrell, II ............... G10L 15/01
369/25.01

(Continued)

FOREIGN PATENT DOCUMENTS

| CN | 101510222 A | 8/2009 |
| CN | 102592628 A | 7/2012 |

(Continued)

OTHER PUBLICATIONS

IBM, "Correlating Audio and Moving-Image Tracks," IBM Technical Disclosure Bulletin, vol. 33, No. 10A, Mar. 1, 1991, pp. 295-296.

*Primary Examiner* — Kieu Vu
*Assistant Examiner* — Roberto Borja
(74) *Attorney, Agent, or Firm* — Birch, Stewart, Kolasch & Birch, LLP

(57) ABSTRACT

Provided is a mobile terminal including a display unit on which a moving image is output; a user input unit through which a moving image segment of the moving image is selected; and a controller that outputs video information corresponding to audio information that is output from the selected moving image segment, on the display unit. The controller converts voice information that is output from the selected moving image segment into text information and outputs the text information on the display unit.

9 Claims, 17 Drawing Sheets

(a)

(b)

(d)

(c)

(51) Int. Cl.
*G11B 27/28* (2006.01)
*G11B 27/11* (2006.01)

(52) U.S. Cl.
CPC ............ *G11B 27/005* (2013.01); *G11B 27/11* (2013.01); *G11B 27/28* (2013.01); *G11B 27/34* (2013.01)

(56) References Cited

U.S. PATENT DOCUMENTS

| | | | |
|---|---|---|---|
| 2002/0054047 A1* | 5/2002 | Toyama | G06T 13/40 345/629 |
| 2003/0110450 A1* | 6/2003 | Sakai | G06F 17/214 715/256 |
| 2004/0113952 A1* | 6/2004 | Randall | G06F 3/0485 715/830 |
| 2005/0123273 A1 | 6/2005 | Jeon et al. | |
| 2005/0283365 A1* | 12/2005 | Mizutani | G10L 15/22 704/257 |
| 2006/0179403 A1 | 8/2006 | Kirkpatrick | |
| 2007/0124298 A1* | 5/2007 | Agrawal | G06F 17/30991 |
| 2008/0295040 A1* | 11/2008 | Crinon | H04N 7/152 715/865 |
| 2009/0060452 A1 | 3/2009 | Chaudhri | |
| 2009/0167940 A1* | 7/2009 | Card, II | G11B 27/005 348/468 |
| 2009/0172543 A1* | 7/2009 | Cronin | G06F 3/04847 715/721 |
| 2010/0003006 A1* | 1/2010 | Tokunaka | G11B 27/034 386/290 |
| 2010/0250252 A1* | 9/2010 | Yasoshima | H04L 12/1827 704/246 |
| 2011/0099011 A1* | 4/2011 | Jaiswal | G10L 15/26 704/235 |
| 2011/0239107 A1 | 9/2011 | Phillips et al. | |
| 2011/0276327 A1* | 11/2011 | Foxenland | G10L 15/26 704/235 |
| 2012/0047437 A1* | 2/2012 | Chan | G06F 3/0482 715/720 |
| 2012/0221330 A1* | 8/2012 | Thambiratnam | G10L 25/84 704/235 |
| 2012/0304062 A1 | 11/2012 | Schultz et al. | |
| 2013/0042283 A1* | 2/2013 | Begeja | H04N 7/17318 725/93 |
| 2013/0308922 A1* | 11/2013 | Sano | H04N 21/4316 386/245 |
| 2015/0063780 A1* | 3/2015 | Shintani | G11B 27/32 386/241 |

FOREIGN PATENT DOCUMENTS

| | | |
|---|---|---|
| EP | 0780777 A1 | 6/1997 |
| EP | 2079234 A2 | 7/2009 |
| WO | WO 2009/136236 A1 | 11/2009 |
| WO | WO 2012/177229 A1 | 12/2012 |

* cited by examiner

FIG. 14
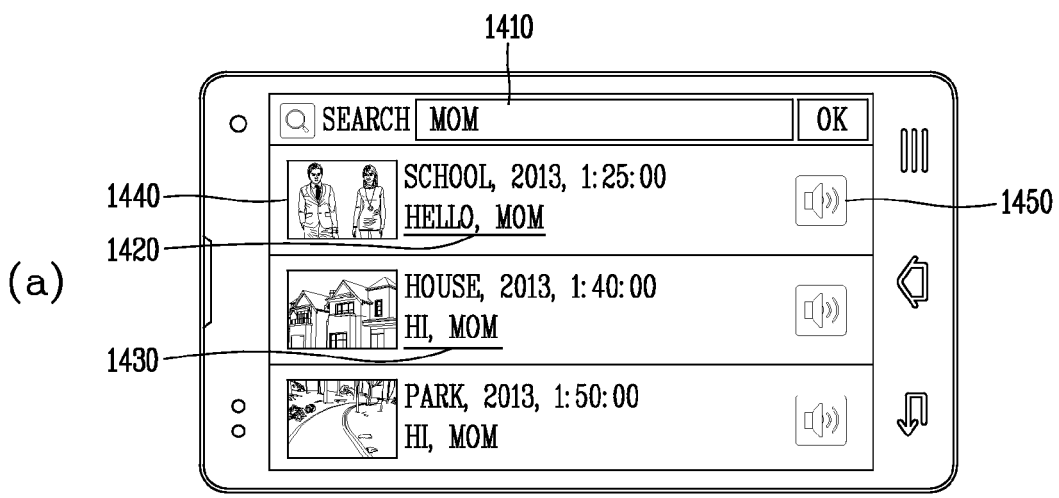
(a)
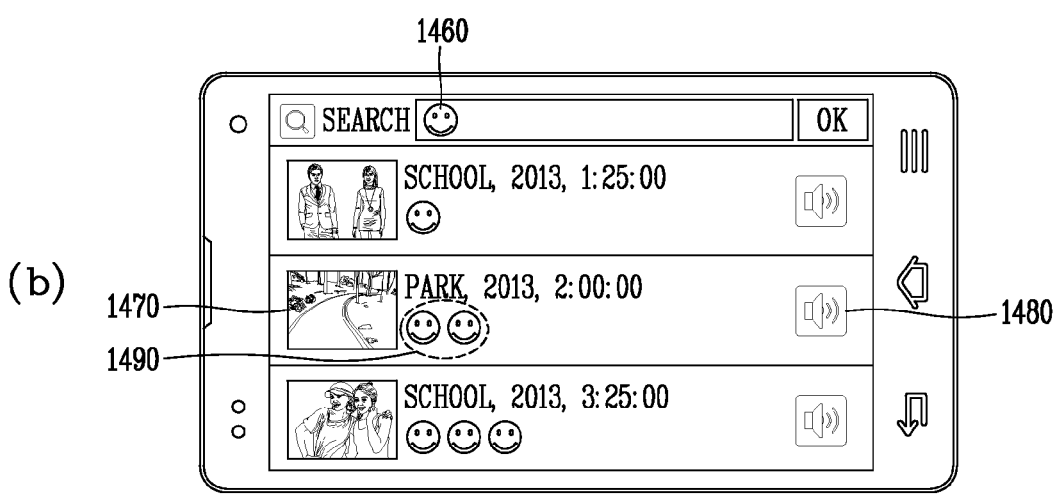
(b)

MOBILE TERMINAL AND METHOD OF CONTROLLING THE MOBILE TERMINAL FOR MOVING IMAGE PLAYBACK

CROSS-REFERENCE TO RELATED APPLICATION

Pursuant to 35 U.S.C. §119(a), this application claims the benefit of earlier filing date and right of priority to Korean Application No. 10-2013-0081695, filed on Jul. 11, 2013, the contents of which is incorporated by reference herein in its entirety.

BACKGROUND OF THE INVENTION

Field of the Invention

The present invention relates a mobile terminal and more particularly to a mobile terminal that is capable of playing back a moving image and a method of controlling the mobile terminal.

Background of the Invention

Terminals may be divided into mobile/portable terminals and stationary terminals. Also, the mobile terminals may be classified into handheld terminals and vehicle mounted terminals.

Mobile terminals can be configured to capture still images or moving images, play music or video files, play games, and receive broadcasts to function as an integrated multimedia player. Many recent improvements to mobile terminals include changes to structural components of mobile terminals and also software changes to support functions of mobile terminals.

In addition, a particular scene in a moving image can be searched for via a search bar by which a playback segment of the moving image can be adjusted. Specifically, the moving image can only be played back by moving the search bar to an arbitrary position.

As a result, a desired scene is difficult to search for because the desired scene can only be searched for with a voice or an image that is output depending on the movement of the search bar. For example, usually, only the image is output and the voice is not heard or is at a high speed corresponding to the search bar being moved at a high speed, which is the cause of the difficulty of searching for the desired scene.

SUMMARY OF THE INVENTION

In order to solve these problems, according to an embodiment of the present invention, a speech-to-text (STT) technology that converts a voice into text information and an audio zooming technology are applied to the mobile terminal.

The audio zooming technology enables a sound to be recorded in a specific direction in which the sound is output from a sound source using a directional microphone or multiple microphones.

Generally, selective directionality between the sound source is used to capture a sound from a sound source in a horizontal or vertical axis when viewed from a user. In order to provide the selective directionality, the multiple microphones are arranged on the rear side of the mobile terminal to be orthogonal to one another or be in the form of a cross. For two microphones, the two microphones are arranged in a straight line in a longitudinal or transverse direction, with spacing in between.

Specifically, the selective directionality is secured by performing signal processing such as beam-forming on the sound (for example, a voice) captured through the multiple microphones. The beam-forming mechanism that the selective directionality is generated by forming a sound capture range with a sound beam.

Therefore, an aspect of the detailed description is to provide a mobile terminal for searching a specific scene in a moving image to improve user convenience and a method of controlling the mobile terminal.

To achieve these and other advantages and in accordance with the purpose of this specification, as embodied and broadly described herein, there is provided a mobile terminal including, for example, a display unit on which a moving image is output, a user input unit through which a segment of the moving image is selected, and a controller that outputs video information corresponding to audio information that is output from the selected segment, on the display unit. The controller may convert voice information that is output from the selected segment into text information and output the text information on the display unit.

The controller may output the video information corresponding to the audio information differently depending on a search speed at which the segment of the moving image is selected.

The controller may output the text information on the display unit in such a manner that the text information is adjacent to a speaker who makes the audio information.

The controller may control the display unit in such a manner that the speaker who makes the audio information is highlighted.

The controller may output a keyword in the text information that is selected depending on the search speed, on the display unit.

The controller may apply a drag input, received via the user input unit, to a search bar that is output on the display unit and thus a content search mode may be entered and the segment of the moving image may be selected, and positions of the search bar may correspond to points in time for playback of the moving image, respectively.

The controller may convert the voice information that is output from the selected segment, into the text information and output the text information on the position of the search bar that corresponds to the point in time for the playback of the moving image, from which the voice information is output.

The controller may output video information corresponding to the audio information, on the position of the search bar that corresponds to the point in time for the playback of the moving image, from which the audio information is output.

The display unit may display multiple audio bars corresponding to the multiple audio information that are input when playing back the moving image, respectively, and with respect to each of the audio bars, the controller may output items of video information corresponding to the items of audio information that are output from the points in time for the playback, on positions of the audio bar corresponding to the points in time for the playback of the moving image, respectively.

To achieve these and other advantages and in accordance with the purpose of this specification, as embodied and broadly described herein, there is provided a method of controlling a mobile terminal. The method may include, for example, selecting a segment of a moving image, and outputting video information corresponding to audio information that is output from the selected segment, on the display unit. The outputting of the video information may include converting voice information that is output from the selected segment into text information and outputting the text information on the display unit.

The outputting of the video information may include outputting the video information corresponding to the audio information differently depending on a search speed at which the segment of the moving image is selected.

The outputting of the video information may include outputting the text information on the display unit in such a manner that the text information is adjacent to a speaker who makes the audio information.

The outputting of the video information may include controlling the display unit in such a manner that the speaker who makes the audio information is highlighted.

The outputting of the video information may include outputting a keyword in the text information that is selected depending on the search speed, on the display unit.

The selecting of the segment may include applying a drag input to a search bar that is output on the display unit and thus entering a content search mode and selecting the segment of the moving image. Positions of the search bar may correspond to points in time of playback of the moving image, respectively.

The outputting of the video information may include converting the voice information that is output from the selected segment, into the text information and outputting the text information on the position of the search bar that corresponds to the point in time for the playback of the moving image, from which the voice information is output.

The outputting of the video information may include outputting video information corresponding to the audio information, on the position of the search bar that corresponds to the point in time for the playback from which the audio information is output.

The selecting of the segment may include outputting multiple audio bars corresponding to the multiple audio information input when the moving image is played back, respectively. The outputting of the video information may include outputting items of video information corresponding to the items of audio information output from the points in time for the playback, on positions of the audio bar corresponding to the points in time for the playback of the moving image, respectively, with respect to each of the audio bars.

The scope of applicability of the present application will become more apparent from the detailed description given hereinafter. However, it should be understood that the detailed description and specific examples, while indicating preferred embodiments of the invention, are given by way of illustration only, and various changes and modifications within the spirit and scope of the invention will become apparent to those skilled in the art.

BRIEF DESCRIPTION OF THE DRAWING

The accompanying drawings, which are included to provide a further understanding of the invention and are incorporated in and constitute a part of this specification, illustrate exemplary embodiments and together with the description serve to explain the principles of the invention.

FIGS. 5(a)-7(d) are display screens illustrating embodiments of a user interface by which audio information is converted into text information and the resulting text information is output;

FIGS. 8(a)-9(d) are display screens illustrating embodiments of the user interface by which video information corresponding to the audio information is output;

FIGS. 10(a)-13(c) are display screens illustrating embodiments of the user interface by which the items of video information corresponding to the multiple audio information, respectively, are output; and FIGS. 14(a)-15(c) are display screens illustrating embodiments of the user interface by which a moving image including the audio information is searched for.

DETAILED DESCRIPTION OF THE INVENTION

Description will now be given in detail according to the exemplary embodiments, with reference to the accompanying drawings. For the sake of brief description with reference to the drawings, the same or equivalent components will be provided with the same reference numbers, and the description thereof will not be repeated. The terms "module" or "unit" used for constituent elements disclosed in the following description are merely used for convenience of explanation, and the terms do not give any special meaning or function to the disclosed constituent elements. In describing the present invention, if a detailed explanation for a related known function or construction is considered to unnecessarily divert the gist of the present invention, such explanation has been omitted but would be understood by those skilled in the art. The accompanying drawings are used to help easily understand the technical idea of the present invention and it should be understood that the present invention is not limited by the accompanying drawings.

Mobile terminals described herein may include, for example, cellular phones, smart phones, laptop computers, digital broadcasting terminals, personal digital assistants (PDAs), portable multimedia players (PMPs), navigators, slate PCs, tablet PC, ultra books and the like. However, it may be easily understood by those skilled in the art that the configuration according to the exemplary embodiments of this specification can be applied to, for example, stationary terminals such as digital TVs and desktop computers.

Figure 1A:
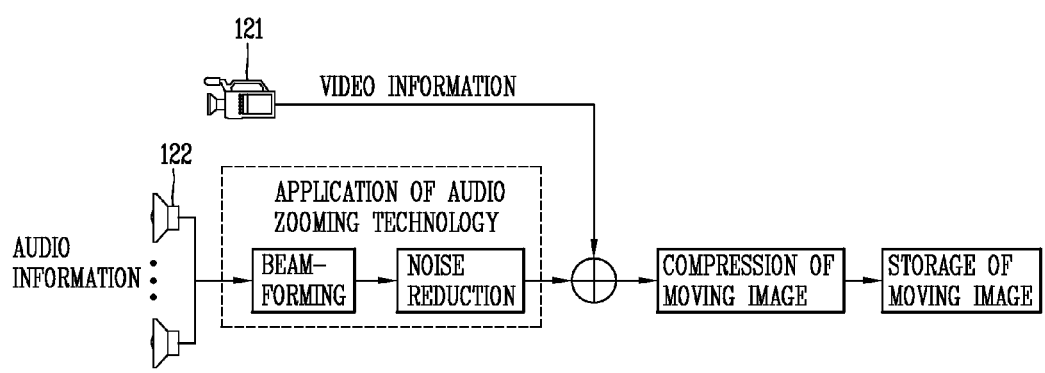
FIG. 1A is a diagram illustrating an audio zooming method according to one embodiment of the present invention.

FIG. 1A is a diagram illustrating one embodiment of an audio zooming method according to one embodiment of the present invention. As illustrated in FIG. 1A, the audio zooming technologies such as the beam-forming and noise reduction can be, for example, applied to the audio information captured by the multiple microphone 122 during image photographing and then combined with image information captured by the camera 121. The image resulting from the combination of the applied audio zooming technologies and the captured image information can be compressed into a predetermined format and stored in the memory 160.

Specifically, a beam-forming processing unit that adaptively forms a sound beam on a user-selected subject for photography selected, and sets a sound capturing range and a noise reduction unit, makes up a signal processing unit of the controller 180.

In addition, when playing back the image, the image that results from the combination is separated into the video information and the audio information. Then, a sound of the subject for photography is selectively captured by applying the audio zooming technology to the audio information that results from the separation. By doing this, image editing is performed.

Figure 1B:
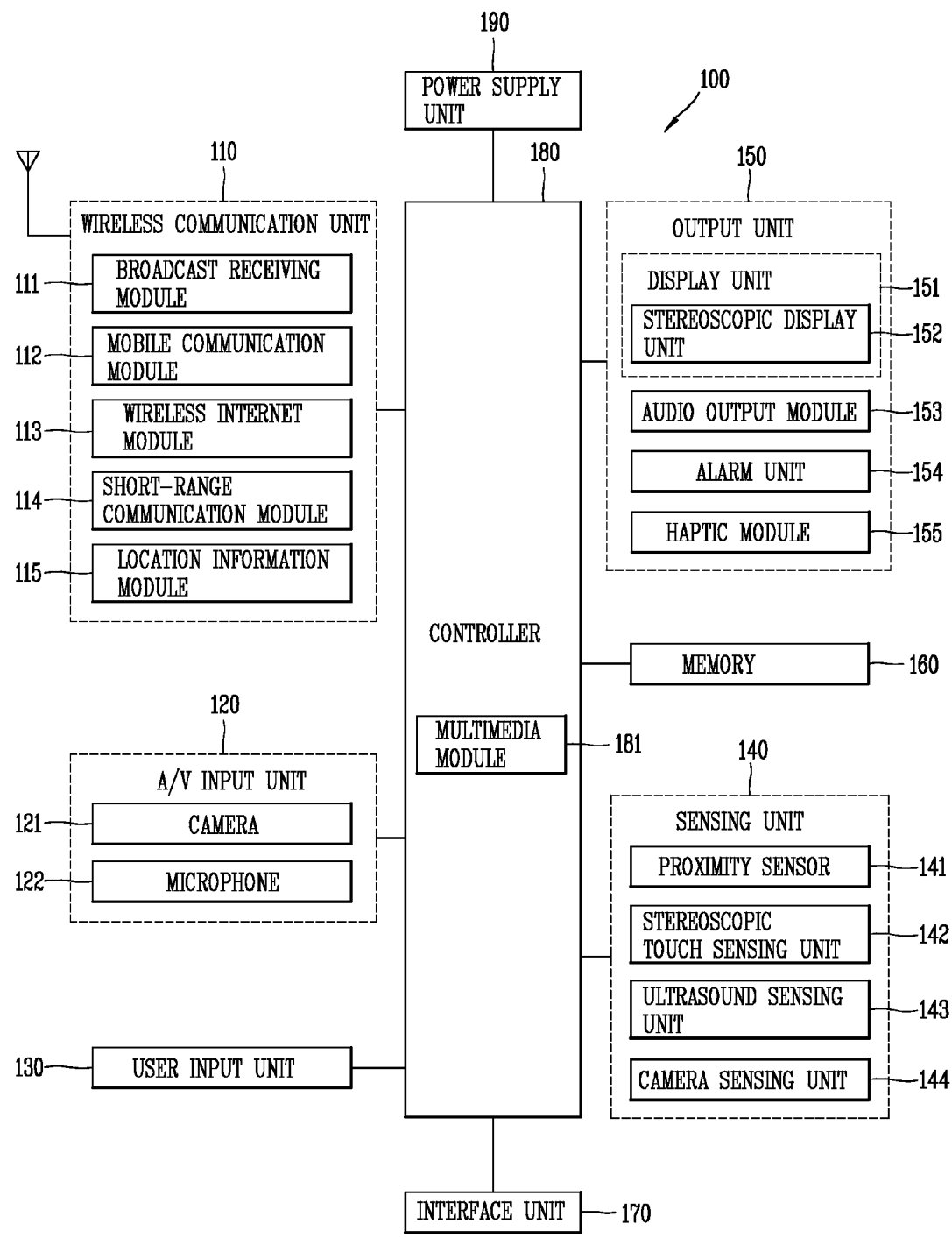
FIG. 1B is a block diagram illustrating a mobile terminal according to one embodiment of the present invention.

FIG. 1B is a block diagram of a mobile terminal 100 in accordance with one exemplary embodiment. As shown in FIG. 1B, the mobile terminal 100 includes components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1B shows the mobile terminal 100 having various components, but it is understood that implementing all of the illustrated components is not a requirement. Greater or fewer components may alternatively be implemented.

Hereinafter, each component 110 to 190 is described in sequence. The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel. The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal.

The broadcast signal may be implemented as a TV broadcast signal, a radio broadcast signal, and a data broadcast signal, among others. The broadcast signal may further include a data broadcast signal combined with a TV or radio broadcast signal. Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems. Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax™), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, Near Field Communication (NFC) and the like.

The location information module 115 denotes a module for detecting or calculating a position of a mobile terminal An example of the location information module 115 may include a Global Position System (GPS) module.

Still referring to FIG. 1B, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Also, a user's position information and the like may be calculated from the image frames acquired by the camera 121. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151, an audio output module 153, an alarm unit 154 and a haptic module 155.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

The display unit 151 may also be implemented as a stereoscopic display unit 153 for displaying stereoscopic images.

Here, the stereoscopic image may be a three-dimensional (3D) stereoscopic image, and the 3D stereoscopic image is an image referring to an image to make a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and sense of reality.

The stereoscopic display unit 152 may employ a stereoscopic display scheme such as stereoscopic scheme (e.g., a glass scheme), an auto-stereoscopic scheme (e.g., a glassless scheme), a projection scheme (e.g., a holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, or the like. The projection scheme includes a reflective holographic scheme, a transmissive holographic scheme, or the like.

In general, a 3D stereoscopic image is comprised of a left image (e.g., a left eye image) and a right image (e.g., a right eye image). According to how left and right images are combined into a 3D stereoscopic image, the 3D stereoscopic imaging method is divided into a top-down method in which left and right images are disposed up and down in a frame, an L-to-R (e.g., left-to-right or side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The generated left image thumbnail and the right image thumbnail are displayed with a horizontal distance difference therebetween by a depth corresponding to the disparity between the left image and the right image on the screen, providing a stereoscopic space sense.

A left image and a right image required for implementing a 3D stereoscopic image may be displayed on the stereoscopic display unit 152 by a stereoscopic processing unit. The stereoscopic processing unit may receive the 3D image and extract the left image and the right image, or may receive the 2D image and change it into a left image and a right image.

Here, if the display unit 151 and a touch sensitive sensor (hereinafter touch sensor) have a layered structure therebetween (hereinafter touch screen), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1B, a proximity sensor 141 may be arranged at an inner region of the mobile terminal 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type touch screen, proximity of a pointer to the touch screen is sensed by changes of an electromagnetic field. In this case, the touch screen may be categorized as a proximity sensor.

Hereinafter, for the sake of brief explanation, a status for the pointer being positioned proximate to the touch screen without contact will be referred to as 'proximity touch', whereas a status for the pointer substantially combing in contact with the touch screen will be referred to as 'contact touch'. For the proximity touch of the pointer, the position of the pointer corresponds to a position where the pointer faces perpendicular to the touch screen.

The proximity sensor 141 senses proximity touches, and proximity touch patterns (e.g., distance, direction, speed, time, position, moving status, etc.). Information relating to the sensed proximity touches and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 detects the distance between a sensing object (e.g., the user's finger or a stylus pen) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to the proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 is configured to recognize position information of the sensing object by using ultrasonic waves. The ultrasonic sensing unit 143 may include, for example, an optical sensor and a plurality of ultrasonic sensors. The optical sensor is configured to sense light and the ultrasonic sensors may be configured to sense ultrasonic waves.

Because light is much faster than ultrasonic waves, a time for which the light reaches the optical sensor is much shorter than a time for which the ultrasonic wave reaches the ultrasonic sensor. Therefore, a position of a wave generation source may be calculated using the light as a reference signal by calculating a time difference from the time when the ultrasonic wave reaches the ultrasonic sensor and the time when the light reaches the optical sensor.

The camera sensing unit 144 includes at least one of a camera, a photo sensor, and a laser sensor. For example, the camera and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor is configured to scan a movement of the sensing object in proximity to the touch screen. In more detail, the photo sensor includes photo diodes and transistors at rows and columns to scan content mounted on the photo sensor by using an electrical signal changing according to the quantity of applied light. Namely, the photo sensor calculates the coordinates of the sensing object according to a variation of light to thus obtain position information of the sensing object.

The audio output module 153 converts and outputs as sound audio data received from the wireless communication unit 110 or stored in the memory 160 in a call signal reception mode, a call mode, a record mode, a voice recognition mode, a broadcast reception mode, and the like. Also, the audio output module 153 can provide audible outputs related to a particular function performed by the mobile terminal 100 (e.g., a call signal reception sound, a message reception sound, etc.). The audio output module 153 may include a speaker, a buzzer or the like.

The alarm unit 154 outputs a signal for informing the user about an occurrence of an event of the mobile terminal 100. Events generated in the mobile terminal may include call signal reception, message reception, key signal inputs, a touch input etc. In addition to video or audio signals, the alarm unit 154 may output signals in a different manner, for example, using vibration to inform the user about an occurrence of an event. The video or audio signals may be also output via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be output or sequentially output.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a phonebook, messages, still images, video, etc.) that is input or output. In addition, the memory 160 may store data regarding various patterns of vibrations and audio signals output when a touch is input to the touch screen.

The memory 160 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receive and transmit power to each element of the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied to the mobile terminal 100 or may serve as a passage to allow various command signals input by the user from the cradle to be transferred to the mobile terminal Various command signals or power input from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively. Also, the controller 180 may execute a lock state to restrict a user from inputting control commands for applications when a state of the mobile terminal meets a preset condition.

Further, the controller 180 may control a lock screen displayed in the lock state based on a touch input sensed on the display unit 151 in the lock state of the mobile terminal. The power supply unit 190 receives external power or internal power and supplies appropriate power required for operating respective elements and components under the control of the controller 180.

Various embodiments described herein may be implemented in, for example, a computer-readable medium using software, hardware, or any combination thereof.

For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units designed to perform the functions described herein. In some cases, such embodiments may be implemented by the controller 180 itself.

For a software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Hereinafter, a communication system which is operable with the mobile terminal 100 according to the present invention will be described. In particular, FIGS. 2A and 2B are conceptual views of a communication system operable with a mobile terminal in accordance with the present invention.

Figure 2A:
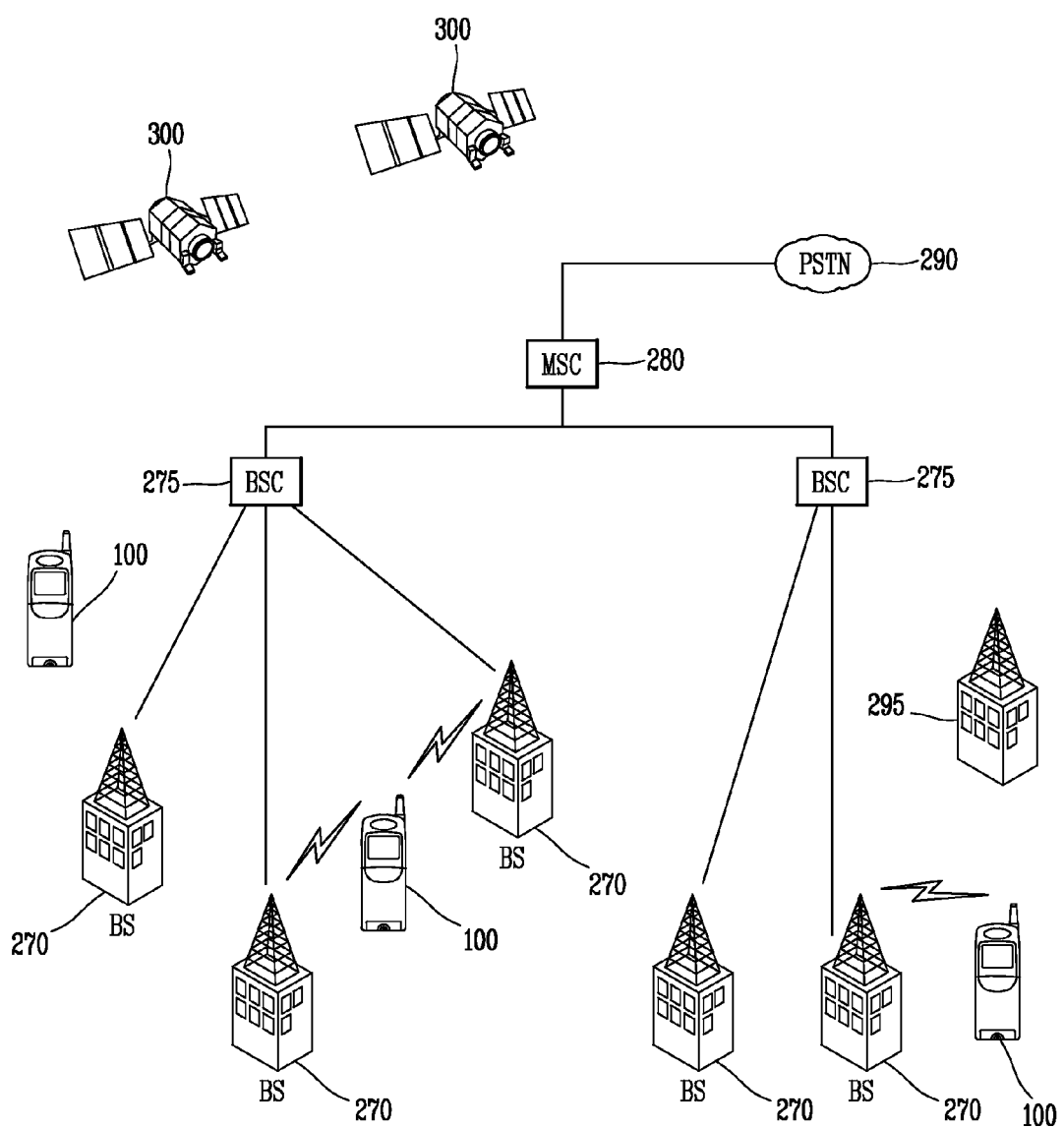
FIGS. 2A and 2B are overviews illustrating a telecommunication system in which the mobile terminal according to the present invention can operate.
Figure 2B:
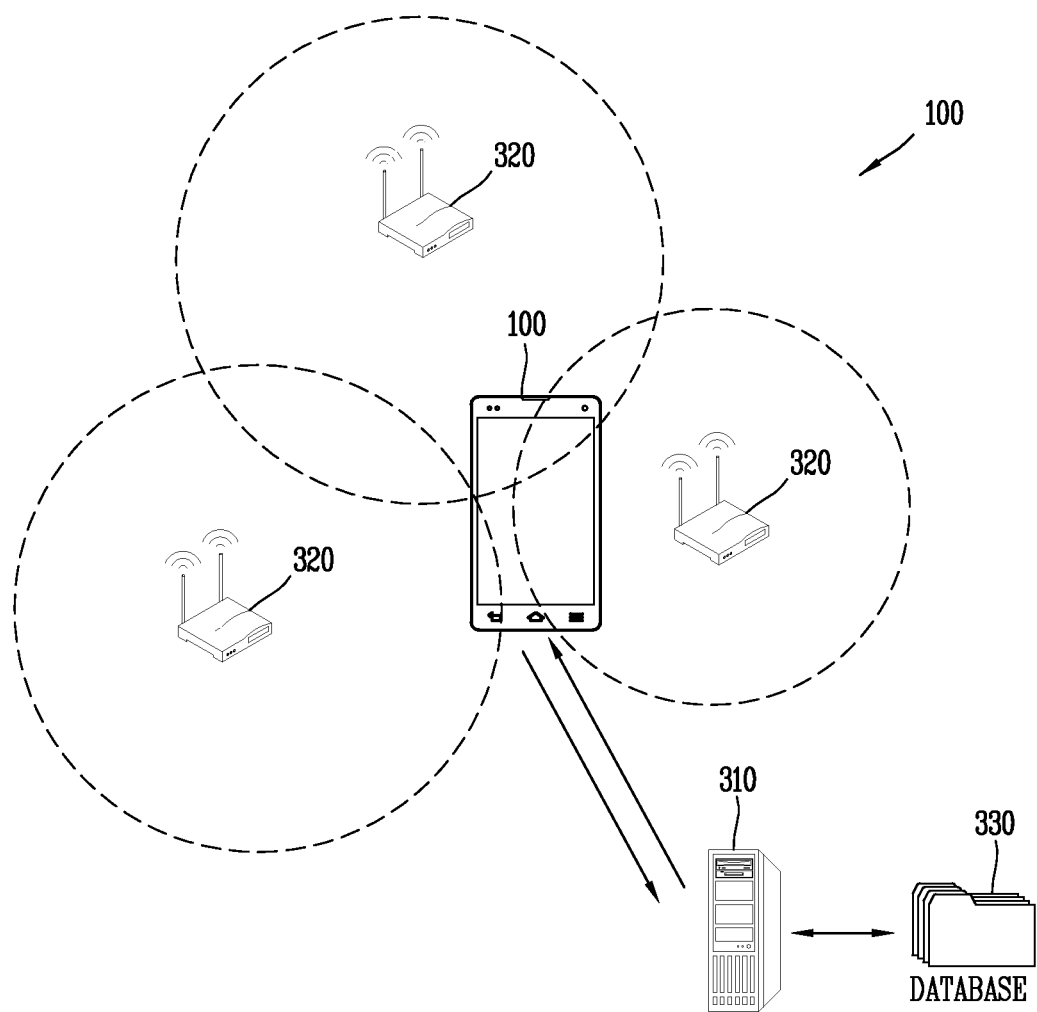

First, referring to FIG. 2A, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

For convenience of explanation, the following description will relate to a CDMA communication system, but such teachings apply equally to other system types including the CDMA wireless communication system.

Referring now to FIG. 2A, a CDMA wireless communication system is shown having a plurality of mobile terminals 100, a plurality of base stations (hereinafter BSs) 270, base station controllers (hereinafter BSCs) 275, and a mobile switching center (hereinafter MSC) 280. The MSC 280 is configured to interface with a conventional Public Switch Telephone Network (hereinafter PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2A.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2A, transmits a broadcast signal to the mobile terminals 100 operating within the system. The broadcast receiving module 111 (FIG. 1B) is typically configured inside the mobile terminal 100 to receive broadcast signals transmitted by the BT 295.

FIG. 2A further depicts several Global Positioning System (GPS) satellites 300. Such satellites 300 facilitate locating the position of at least one of plural mobile terminals 100. Two satellites are depicted in FIG. 2, but it is understood that useful position information may be obtained with greater or fewer satellites than two satellites. The GPS module 115 (FIG. 1B) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Hereinafter, description will be given of a method for acquiring location information of a mobile terminal using a wireless fidelity (WiFi) positioning system (WPS), with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information. The WiFi location determination server 310 extracts the information of the wireless AP 320 connected to the mobile terminal 100 based on a location information request message (or signal) of the mobile terminal 100.

The information of the wireless AP 320 may be transmitted to the WiFi location determination server 310 through the mobile terminal 100 or transmitted to the WiFi location determination server 310 from the wireless AP 320. The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as a MAC address, SSID, RSSI, channel information, privacy, network type, latitude and longitude coordinates, a building at which the wireless AP is located, a floor number, detailed indoor location information (GPS coordinate available), an AP owner's address, a phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the mobile terminal 100 may be transmitted to the mobile terminal 100 through the WiFi location determination server 310, thereby acquiring the location information of the mobile terminal 100.

Figure 3A:
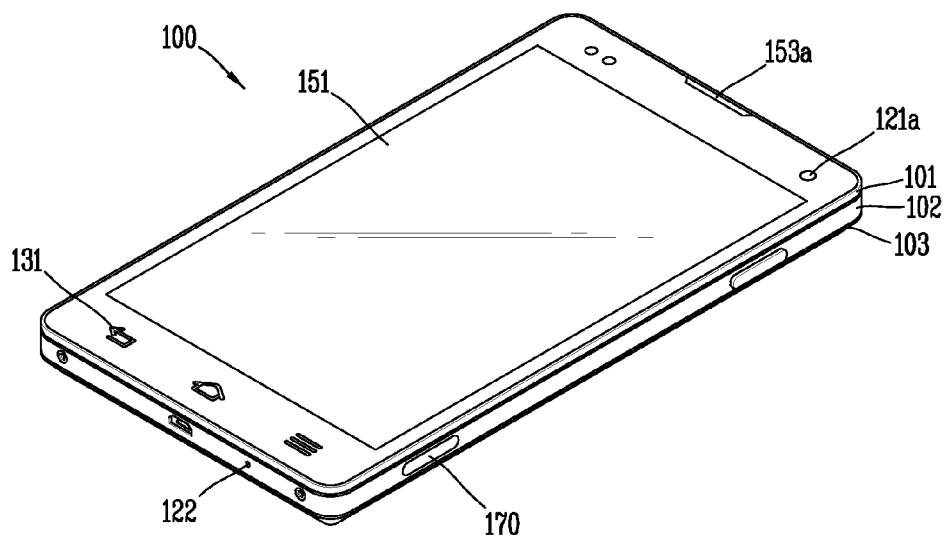
FIG. 3A is a front perspective diagram and FIG. 3B is a rear perspective diagram illustrating the mobile terminal according to an embodiment of the present invention.

Next, FIG. 3A is a front perspective view illustrating an embodiment of the mobile terminal 100 according to the present invention.

The mobile terminal 100 disclosed herein is provided with a bar-type terminal body. However, the present invention is not limited to this, but is also applicable to various structures such as watch type, clip type, glasses type or folder type, flip type, swing type, swivel type, or the like, in which two and more bodies are combined with each other in a relatively movable manner.

The body includes a case (e.g., a casing, a housing, a cover, etc.) forming the appearance of the terminal. In this embodiment, the case may be divided into a front case 101 and a rear case 102. Various electronic components are incorporated into a space formed between the front case 101 and the rear case 102. At least one middle case may be additionally disposed between the front case 101 and the rear case 102, and a battery cover 103 for covering the battery 191 may be detachably configured at the rear case 102. The cases may be formed by injection-molding a synthetic resin or may be also formed of a metal, for example, stainless steel (STS), titanium (Ti), or the like.

A display unit 151, a first audio output module 153a, a first camera 121a, a first manipulating unit 131 and the like may be disposed on a front surface of the terminal body, and a microphone 122, an interface unit 170, a second manipulating unit 132 and the like may be provided on a lateral surface thereof.

The display unit 151 may be configured to display (output) information being processed in the mobile terminal 100. The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

The display unit 151 may include a touch sensing means to receive a control command by a touch method. When a touch is made to any one place on the display unit 151, the touch sensing mechanism may be configured to sense this touch and enter the content corresponding to the touched place. The content entered by a touch method may be a text or numerical value, or a menu item capable of indication or designation in various modes.

The touch sensing mechanism may be formed with transparency to allow visual information displayed on the display unit 151 to be seen, and include a structure for enhancing the visibility of a touch screen at bright places. Referring to FIG. 3A, the display unit 151 occupies a portion including most of the front surface of the front case 101.

The first audio output unit 153a and the first camera 121a are disposed in a region adjacent to one of both ends of the display unit 151, and the first manipulation input unit 131 and the microphone 122 are disposed in a region adjacent to the other end thereof. The second manipulation interface 132 (refer to FIG. 3B), the interface 170, and the like may be disposed on a lateral surface of the terminal body.

The first audio output module 153a may be implemented in the form of a receiver for transferring voice sounds to the user's ear or a loud speaker for outputting various alarm sounds or multimedia reproduction sounds. The first audio output module 153a may be configured to generate sounds that are released along an assembly gap between the structural bodies. In this case, a hole independently formed to output audio sounds may be hidden from view in terms of appearance, thereby further simplifying the appearance of the mobile terminal 100. However, the present invention is not limited to this, but a hole for releasing the sounds may be formed on the window.

The first camera 121a processes video frames such as still or moving images obtained by the image sensor in a video call mode or capture mode. The processed video frames may be displayed on the display unit 151.

In addition, the user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed in a tactile manner allowing the user to perform manipulation with a tactile feeling such as touch, push, scroll or the like.

Still referring to FIG. 3A, the first manipulation unit 131 is a touch key, but the present invention is not limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being output from the first audio output module 153a, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth™ port, a wireless LAN port, and the like), and a power supply terminal for supplying power to the mobile terminal 100. The interface unit 170 may be implemented in the form of a socket for accommodating an external card such as a Subscriber Identification Module (SIM) or a User Identity Module (UIM), and a memory card for information storage.

Figure 3B:
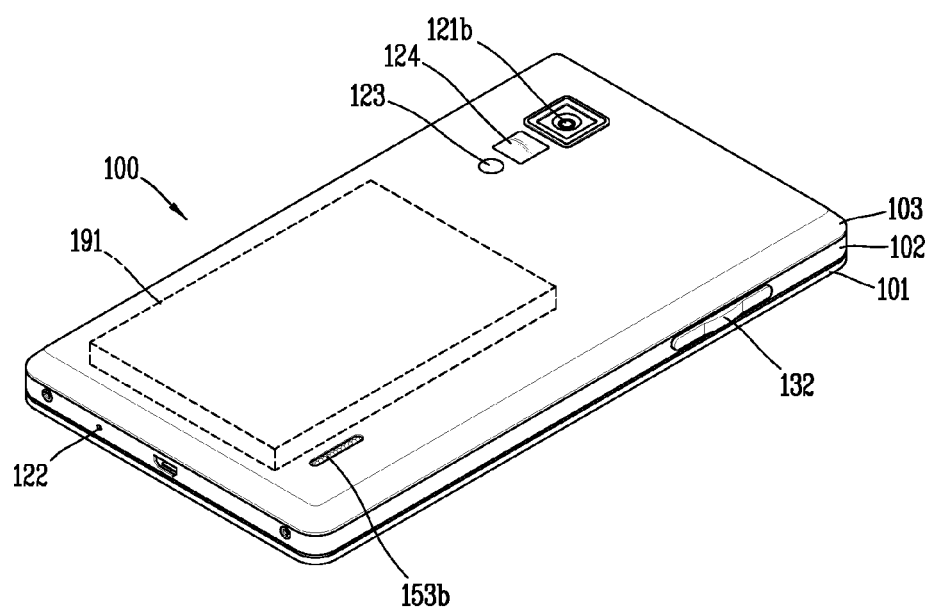

Next, FIG. 3B is a rear perspective view illustrating one embodiment of the mobile terminal 100 in FIG. 3A when viewed from the rear. Referring to FIG. 3B, a second camera 121b may be additionally mounted at a rear surface of the terminal body, namely, the rear case 102. The second camera 121b has an image capturing direction, which is substantially opposite to the direction of the first camera unit 121a (refer to FIG. 3A), and may have a different number of pixels from that of the first camera unit 121a.

For example, it is preferable that the first camera 121a has a relatively small number of pixels not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and popup ready manner.

Furthermore, a flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (e.g., in a self-portrait mode) by using the second camera 121b.

A second audio output unit 153b may be additionally disposed at a rear surface of the terminal body. The second audio output unit 153b together with the first audio output unit 153a (refer to FIG. 3A) can implement a stereo function, and may be also used to implement a speaker phone mode during a phone call.

An antenna for receiving broadcast signals may be additionally disposed at a lateral surface of the terminal body in addition to an antenna for making a phone call or the like. The antenna constituting part of the broadcast receiving module 111 (refer to FIG. 1B) may be provided in the terminal body in a retractable manner.

A power supply unit 190 (refer to FIG. 1B) for supplying power to the mobile terminal 100 may be mounted on the terminal body. The power supply unit 190 may be incorporated into the terminal body, or may include a battery 191 configured in a detachable manner on the outside of the terminal body. The drawing illustrates the battery cover 103 is combined with the rear case 102 to cover the battery 191, thereby restricting the battery 191 from being released and protecting the battery 191 from external shocks and foreign substances.

In addition, a particular scene in a moving image played on the mobile terminal can be searched for through a search bar to adjust a playback segment of the moving image. Specifically, the moving image has to be played back by moving the search bar to an arbitrary position to search for the particular scene.

However, this is difficult for the user because a desired scene has to be searched for only with a voice or an image that is output depending on movement of the search bar. For example, usually, only the image is output and the voice is not heard or is heard at a high speed while moving the search bar at a fast speed, making it difficult to search for the desired scene.

Accordingly, the mobile terminal 100 for improving user convenience in searching for the particular scene in the moving image and a method of controlling the mobile terminal 100 are described below referring to the accompanying drawings.

Figure 4:
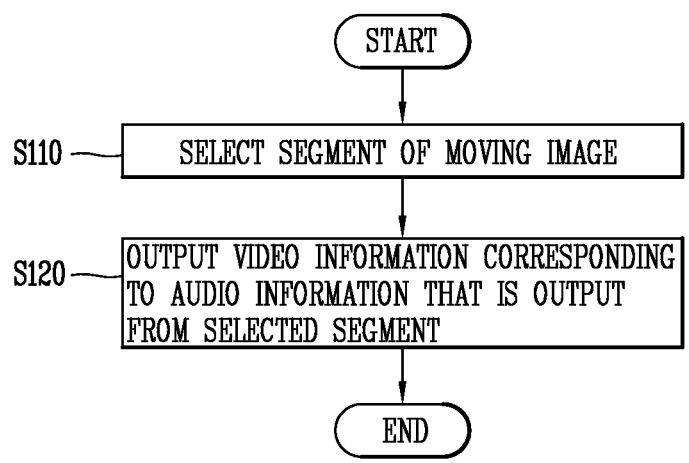
FIG. 4 is a flowchart illustrating a method of controlling the mobile terminal according to one embodiment of the present invention.

FIG. 4 is a flowchart illustrating a method of controlling the mobile terminal 100 according to one embodiment of the present invention. Referring to FIG. 4, a segment included in the moving image is selected (S110).

The segment included in the moving image may be selected by, for example, a touch input applied to the display unit 151 or by a physical-key input. Then, video information corresponding to audio information that is output from the selected segment on the display unit (S120).

Specifically, examples of audio information includes human voice, sound from living things or objects other than human beings, and others. The video information includes a verbal balloon including text information into which a human voice is converted, an icon or an emoticon that corresponds to an animal voice, and the like. Also, the video information corresponding to the audio information is output differently depending on the time it takes to select the segment.

As an embodiment, if the segment is selected at a speed greater than a predetermined time, one part of the audio information that is output from the selected segment is converted into the text information and the resulting text information is output.

Figure 5:
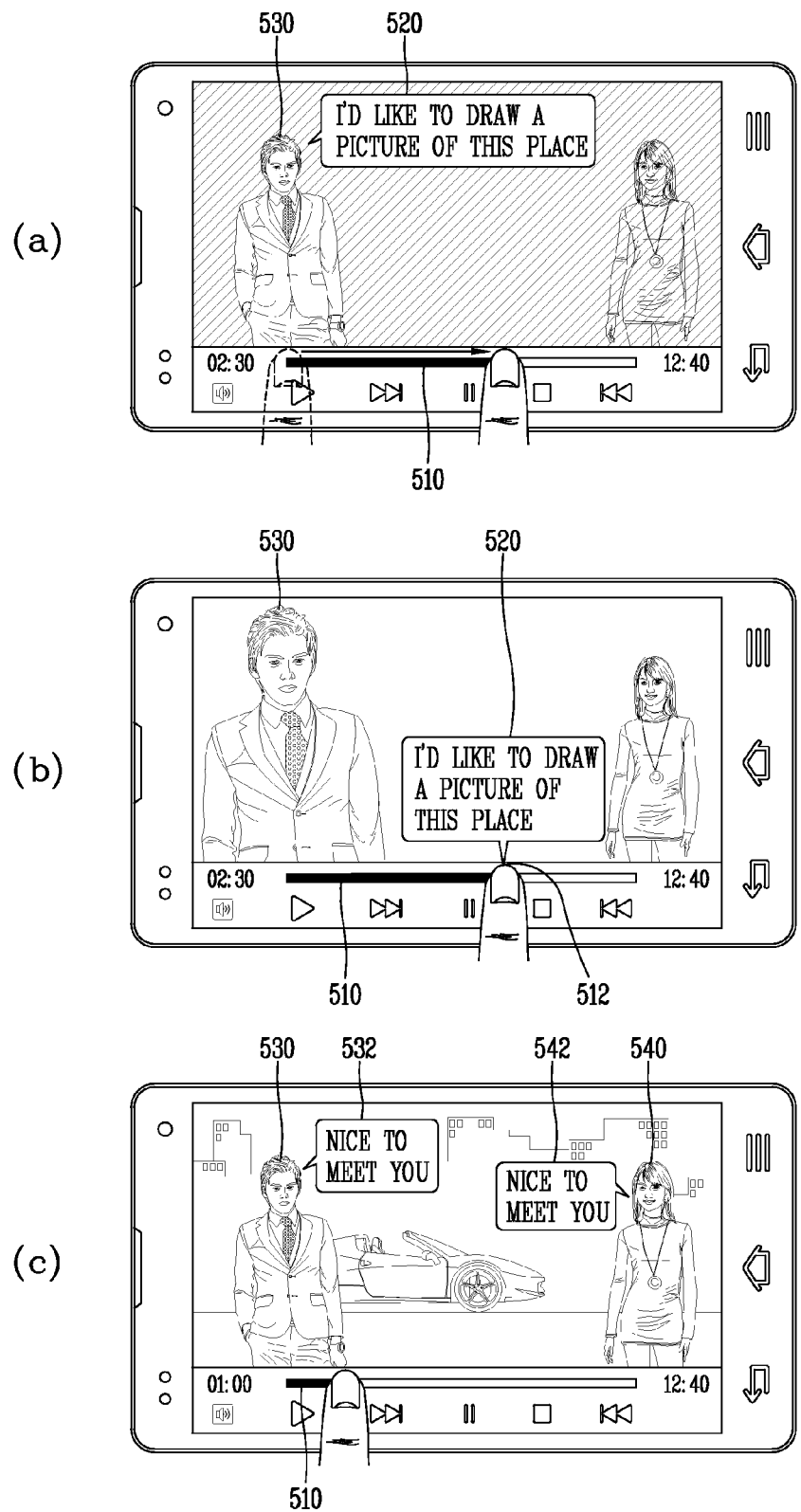

In more detail, FIGS. 5(*a*)-7(*d*) are display screens illustrating embodiments of a user interface by which the audio information is converted into the text information and the resulting text information is output. Referring to FIG. 5(*a*), the segment included in the moving image is selected by a drag input that is applied to a search bar 510, and the audio information that is output from the selected segment is converted into text information 520 and the resulting text information 520 is output.

Specifically, when the drag input is applied to the search bar 510, the mobile terminal 100 automatically switches to a moving image search mode. In addition, positions of the search bar 510 correspond to points in time for the playback of the moving image, respectively. The user selects the segment included in the moving image by applying the drag input to a point in time at which the moving image is started, or by applying the drag input directly to an arbitrary point in time for the playback of the moving image.

Subsequently, the audio information that is output from the point in time for the playback of the moving image, which corresponds to the position of the search bar 510 is converted into the text information 520 and then the resulting text information 520 is output in such a manner that the resulting test information 520 is adjacent to a speaker who makes the audio information.

As an embodiment, the voice made by a speaker 530 that is output from the selected segment is converted into the text information, and then a verbal balloon 520 including the text information is output in such a manner as to face the speaker 530.

In addition, an image of the speaker 530 is output in such a highlighted manner. As an embodiment, the image of the speaker 530 may be clearly output with a dim image effect in the background. In addition, the image of the speaker may be output larger than those of the other persons output in the moving image, or output in a different color than those of the other persons.

As an embodiment, the audio information may be output together with the video information. That is, the text information into which the voice made by the speaker is converted may be output with the voice made by the speaker.

Even though the user ends the drag input, if the touch is maintained on the search bar, the moving image may, for example, be continuously played back. At this point, the moving image is played back at a speed that is faster or slower than the normal playback speed.

Referring to FIG. 5(*b*), the audio information that is output from the selected segment is converted into the text information 520 and the text information 520 is output on a position 512 of the search bar that corresponds to the point in time for the playback of the moving image, on which the audio information is output.

Specifically, the voice made by the speaker that is output from the selected segment is converted into the text information, and then the verbal balloon 520 including the text information is output on the position of the search bar 512 that corresponds to the point in time at which the voice is output.

As described above, an image of the speaker 530 is output in an emphasized manner. For example, the image of the speaker 530 is displayed larger than images of the other persons, or is output together with an indicator indicating the speaker 530.

Referring to FIG. 5(*c*), if the multiple speakers 530 and 540 are present in the selected segment, the voice made by each of the speakers 530 and 540 is converted into the text information, and multiple verbal balloons 532 and 542 including the items of text information are output in such a manner as to face the multiple speakers 530 and 540, respectively. That is, a scene is output in which the multiple speakers 530 and 540 have a conversation.

Referring to FIGS. 5(*a*)-5(*c*), the user can search the moving image to find the scene that he or she desires, through the use of the text information that results from the conversion. In addition, a keyword in the text information, which is selected based on the time that it takes to select the segment is output as the video information.

Figure 6:
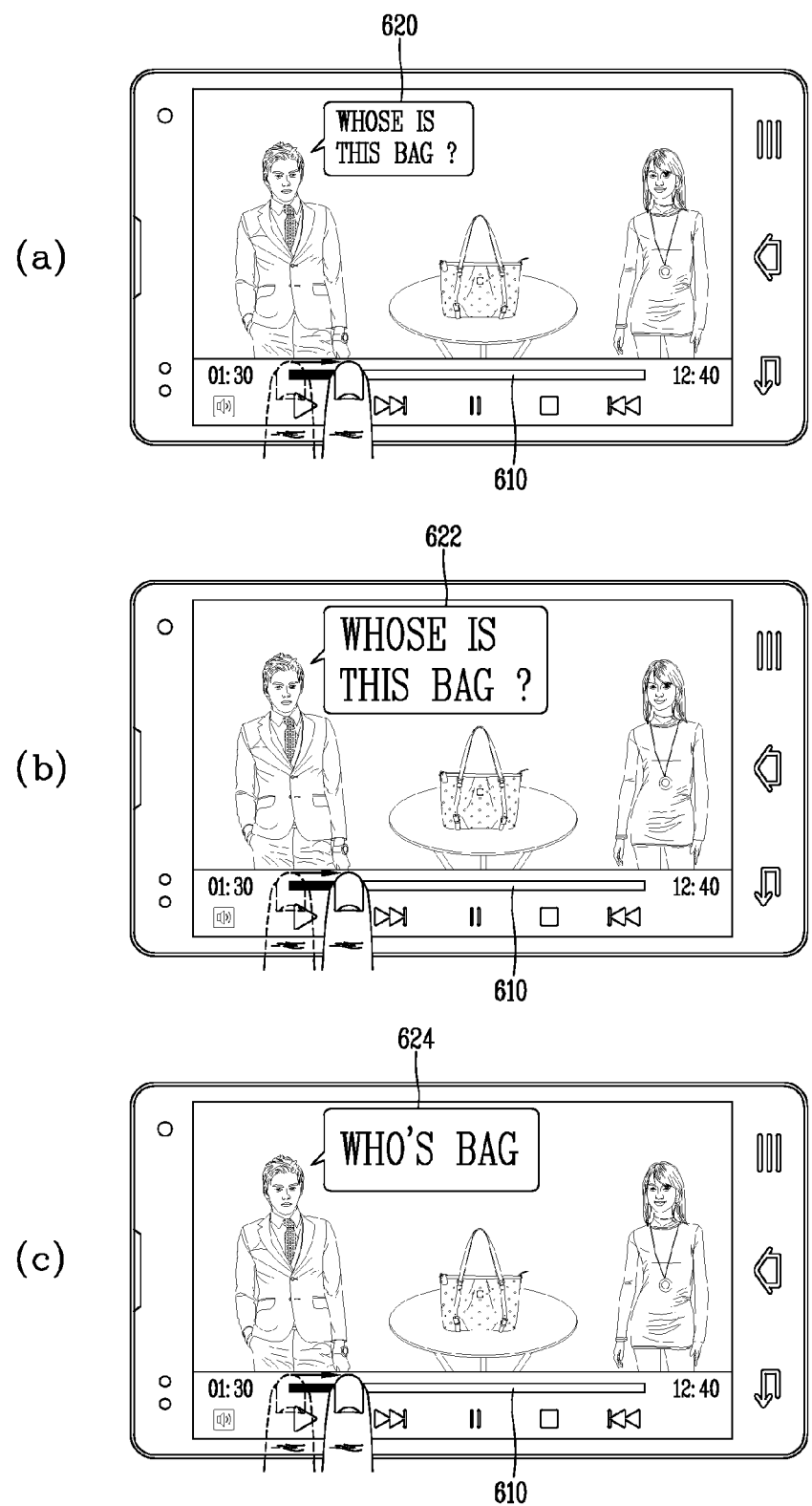

Referring to FIG. 6(*a*), when the user applies the drag input to a search bar 610, at user-predetermined speed or less, the entire voice that is output is converted into text information 620 and the resulting text information 620 is output. Accordingly, the user can specifically search the entire contents of the voice that is output from the moving image.

Referring to FIG. 6(*b*), when the user applies the drag input to a search bar 610, at user-predetermined speed or more, the entire voice that is output is converted into the text information. Subsequently, the keywords are selected from the text information that results from the conversion and text information 622 is output in a highlighted manner. For example, the selected keyword is displayed larger than the other text information or output in a different color or font than the other text information. In addition, the selected key word is output in an underlined manner.

Referring to FIG. 6(*c*), when the user applies the drag input to the search bar 610, at user-predetermined speed or more, one part of the voice that is output is converted into text information 624 and the resulting test information 624 is output.

Still referring to FIG. 6(*c*), when the user applies the drag input to the search bar 610, at user-predetermined speed or more, only the voice that is frequently output from the moving image is converted into the text information 624 and the resulting text information 624 is output. In addition, the keyword, i.e., the core content, is selected from the voice that is output and only the selected keyword 624 may be output. The text information that results from the conversion is output in a comparatively large font, or in a noticeable color.

That is, referring to FIGS. 6(*b*) and 6(*c*), the readability for the user is increased when searching the moving image at fast speed. For example, by comparing the speed at which the drag input is applied and an amount of voice that is output, the entire voice or one part of the voice is converted into the text information and the resulting text information is output. Specifically, if the user applies the fast drag input, but an amount of voice that is output is small, the entire voice is converted into the text information, and the resulting text information is output.

In addition, the verbal balloon including the text information into which the voice is converted is output differently depending on the characteristic of the voice that is output. Specifically, a shape, a color, or a size of the verbal balloon is output differently depending on a speaker who makes the voice that is output, an amount of voice, a voice tone or the like.

Figure 7:
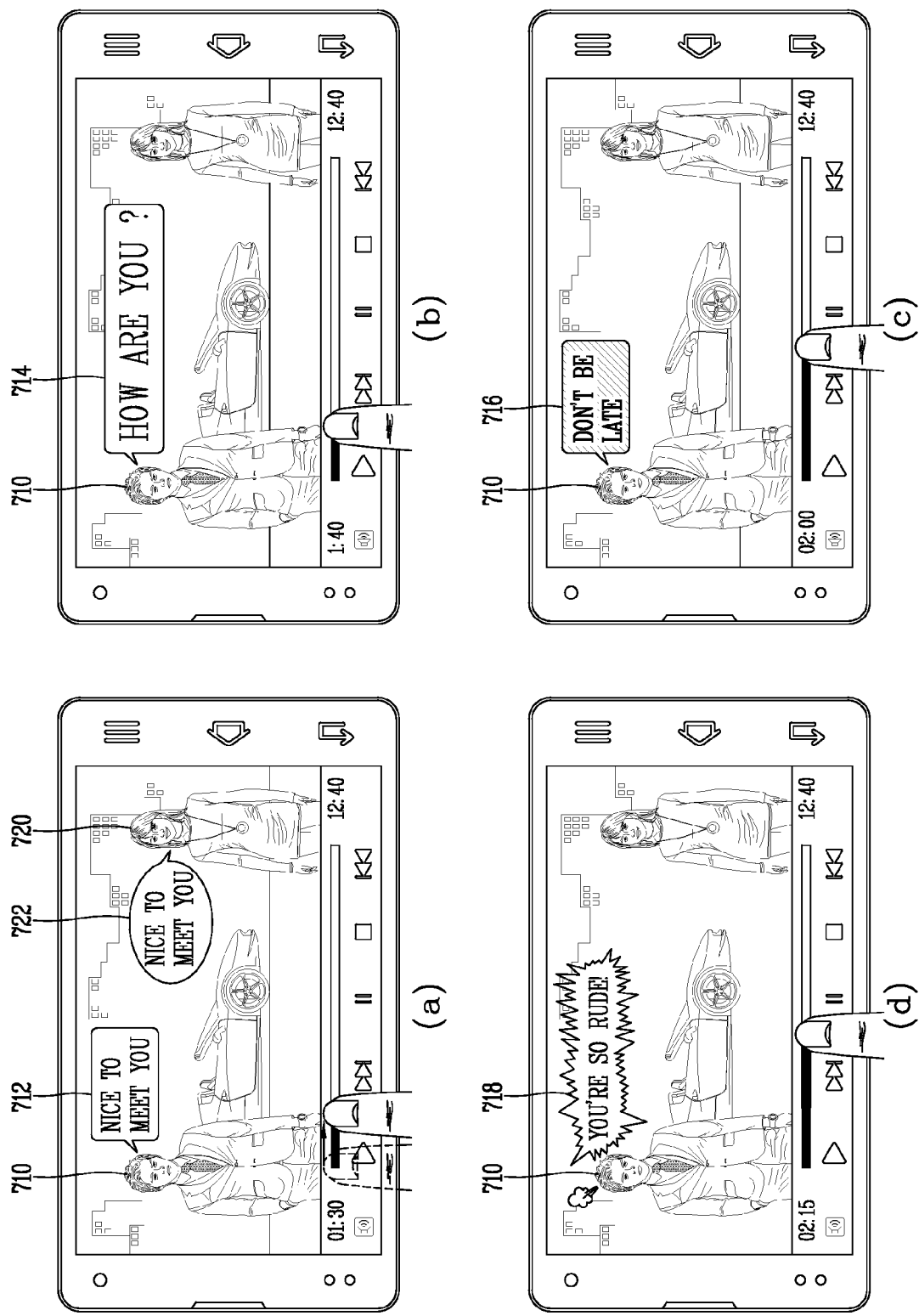

Referring to FIG. 7(*a*), the text information for the voice output of a speaker 710 and the text information for the voice output of a speaker B are output using different verbal balloons 712 and 722, respectively.

Referring to FIG. 7(*b*), if the speaker 710 speaks more loudly or at a predetermined decibel level or higher, in the previous scenes in the moving image, a verbal balloon 714 is output with the size thereof being increased. In addition, the text information included in a verbal balloon may be output with the size thereof being increased.

Referring to FIG. 7(*c*), if the speaker 710 speaks in a different voice tone than in the previous scenes in the moving image, or in a predetermined voice tone, a verbal balloon 716 is output with the color thereof being changed. In addition, the speaker who makes the voice, the amount of voice and the voice tone are considered at the same time.

Referring to FIG. 7(*d*), if the speaker 710 speaks loudly in an angry voice tone, a verbal balloon 718, different in shape from the existing verbal balloon, is output. Further, the human voice carrying no specific meaning and the audio information generated from the living things and the objects other than the human beings are converted into the video information, and the resulting video information is output. For example, a baby's cry, an animal-created sound, a raining sound, a sound of a falling object, or the like may be converted into the corresponding video information, and the resulting video information is output.

As an embodiment, the emoticon may be output as the video information corresponding to the audio information.

In addition, a different expressive emoticon is output depending on the characteristics of the audio information.

Figure 8:
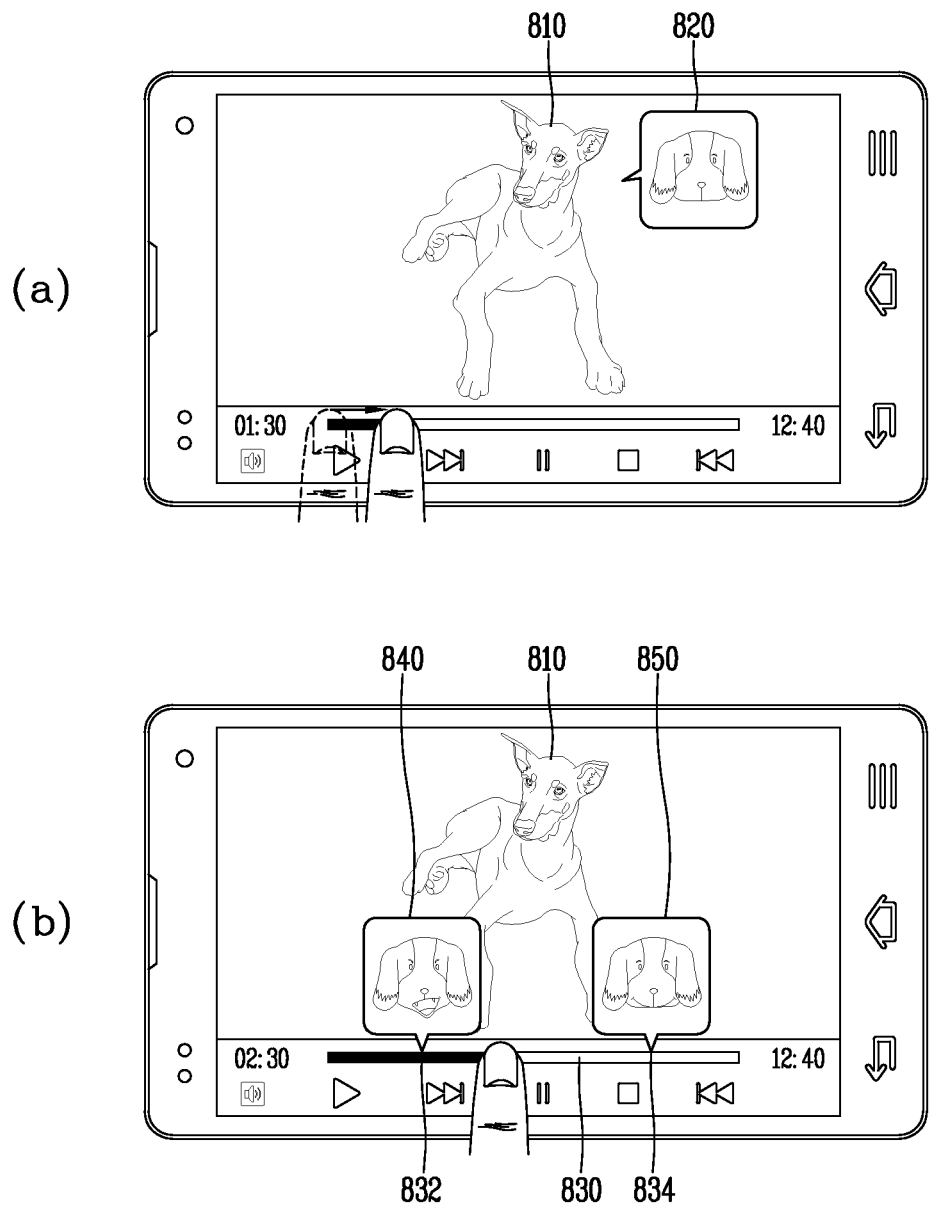

Next, FIGS. 8(*a*)-9(*d*) are display screens illustrating embodiments of the user interface by which the video information corresponding to the audio information is output. Referring to FIG. 8(*a*), video information 820 corresponding to a barking sound of a pup 810 is output so that the video information 820 is arranged adjacent to the pup 810. For example, the video information corresponding to the barking sound made by the pup 810 is output as an emoticon 820 that represents the pup.

In addition, an expression of the pup in the emoticon 820 is differently output depending on the characteristics of the sound made by the pup. For example, when the pup barks angrily and loudly and when the pup barks softly, the different expressions are output, respectively, in order to help the user to intuitively understand the characteristics of the sound.

Referring to FIG. 8(*b*), items of video information 840 and 850 corresponding to items of audio information are output on positions 832 and 834 of a search bar 830 corresponding to the point in time for the playback of the moving image, at which items of audio information are output. Specifically, when the user applies the drag input to the search bar 830, the pup emoticons 840 and 850 are output on the positions 832 and 834 of the search bar, on which the items of audio information are output, respectively. By doing this, the user can easily grasp the segment of the moving image from which the audio information is output.

In addition, as described above, the emoticons 840 and 850 depicting various expressions are output by analyzing the decibel level of the sound made by the pup or a pattern of the sound. For example, if the pup barks violently, the pup emoticon 840 depicting a violent expression is output. In addition, if the pup barks pleasantly at his owner, the pup emoticon depicting a smiling expression is output.

The video information corresponding to the audio information may be output, for example, to the search bar only while the drag input is applied to the corresponding position on the search bar. Accordingly, only the pup emoticon 840 may be output that depicts the violent expression while the user drag input is present within the segment on the search bar corresponding to the output that depicts the violent expression.

Figure 9:
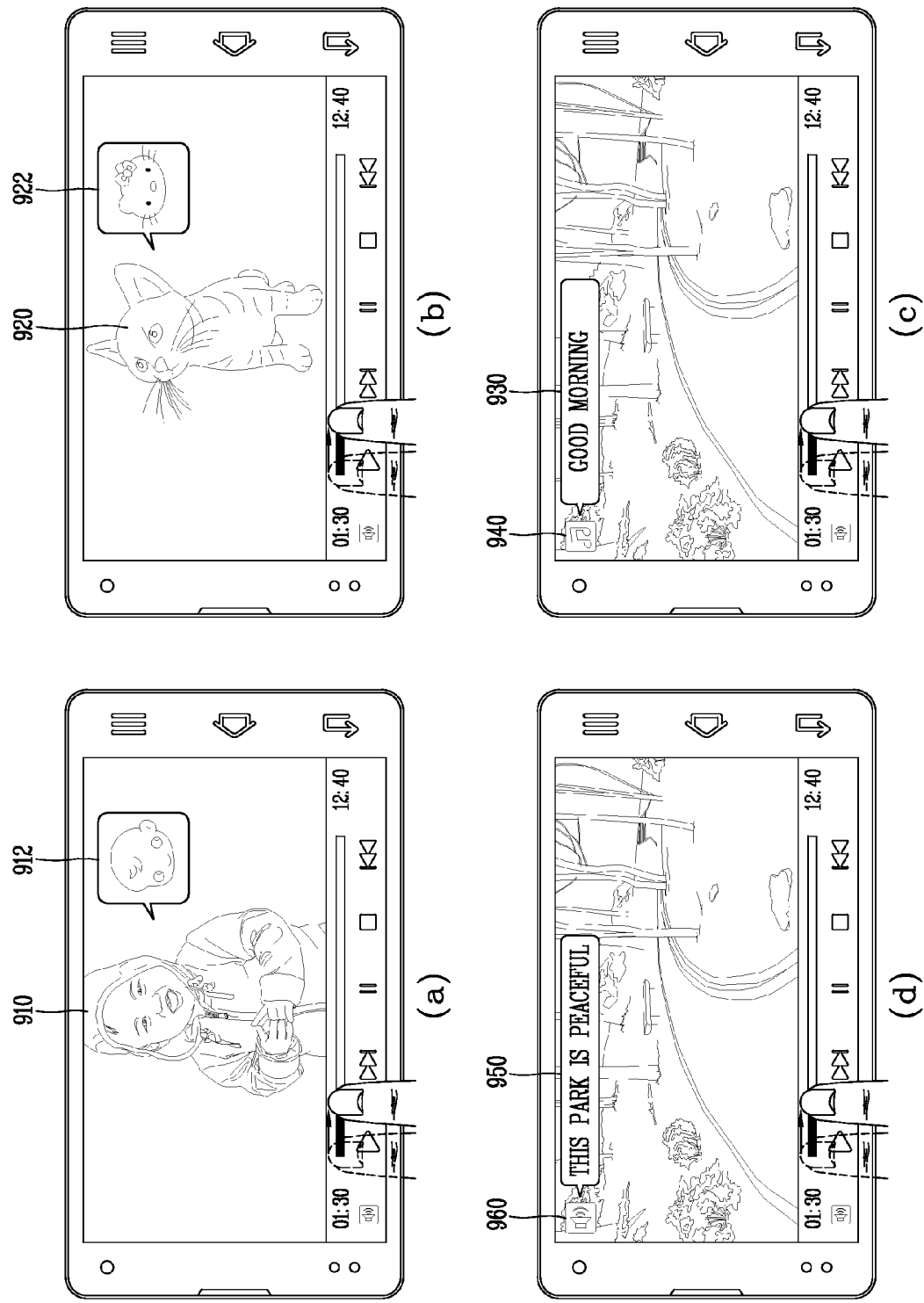

Referring to FIG. 9(*a*), an emoticon 912 is output that corresponds to a voice made by a baby 910. As described above, emoticons depicting various expressions including a crying expression and a smiling expression are output by analyzing the voice made by the baby.

Referring to FIG. 9(*b*), an emoticon 922 corresponding to a sound made by a cat 920 is output. As described above, the emoticons depicting various expressions are output by analyzing the decibel level of the sound made by the cat or a pattern of the sound. Referring to FIG. 9(*c*), if a song is output, video information 930 corresponding to the song is output. Specifically, the words 930 of the song are output depending on the segment to which the drag input is applied.

In addition, the words 930 of the song are output on the edge portion of the screen 151 in order to minimize a region that is hidden by the words 930 of the song that is output. In addition, if an icon 940 indicating the presence of the words of the song is touched on, the words of the song are output.

As an embodiment, if an image of a singer is output together, the verbal balloon containing the words of the song is output so as to face the image of the singer. In addition, the icon indicating the singer is output together with the image of the singer. As another embodiment, information such as a song title, a songwriter, a composer, and a singer name may be output together.

Referring to FIG. 9(d), if the speaker is not present in the moving image and a narration is present, a script 950 is output. As illustrated in FIG. 9(c), the script 950 is output on a region on which an object that is output on the screen 151 is not present or is comparatively small, in order to minimize a region that is hidden by the script 950. In addition, if the user touches on an icon 960 indicating the presence of the script, the script 950 is output.

Further, multiple audio bars are output that correspond to the multiple items of audio information that are output when playing back the moving image, respectively. As an embodiment, the audio bar may be output that corresponds to the speaker. Accordingly, the user can search for the voice made by the speaker that he or she desires to view.

In addition, with respect to each of the audio bars, the items of video information corresponding to the items of audio information that are output from the point in time for the playback are output on positions of the audio bar, corresponding to the points in time for the playback of the moving image, respectively. Multiple microphones are provided in the mobile terminal 100 to record the items of audio information and distinguish between the items of audio information according to corresponding audio sources.

Figure 10:
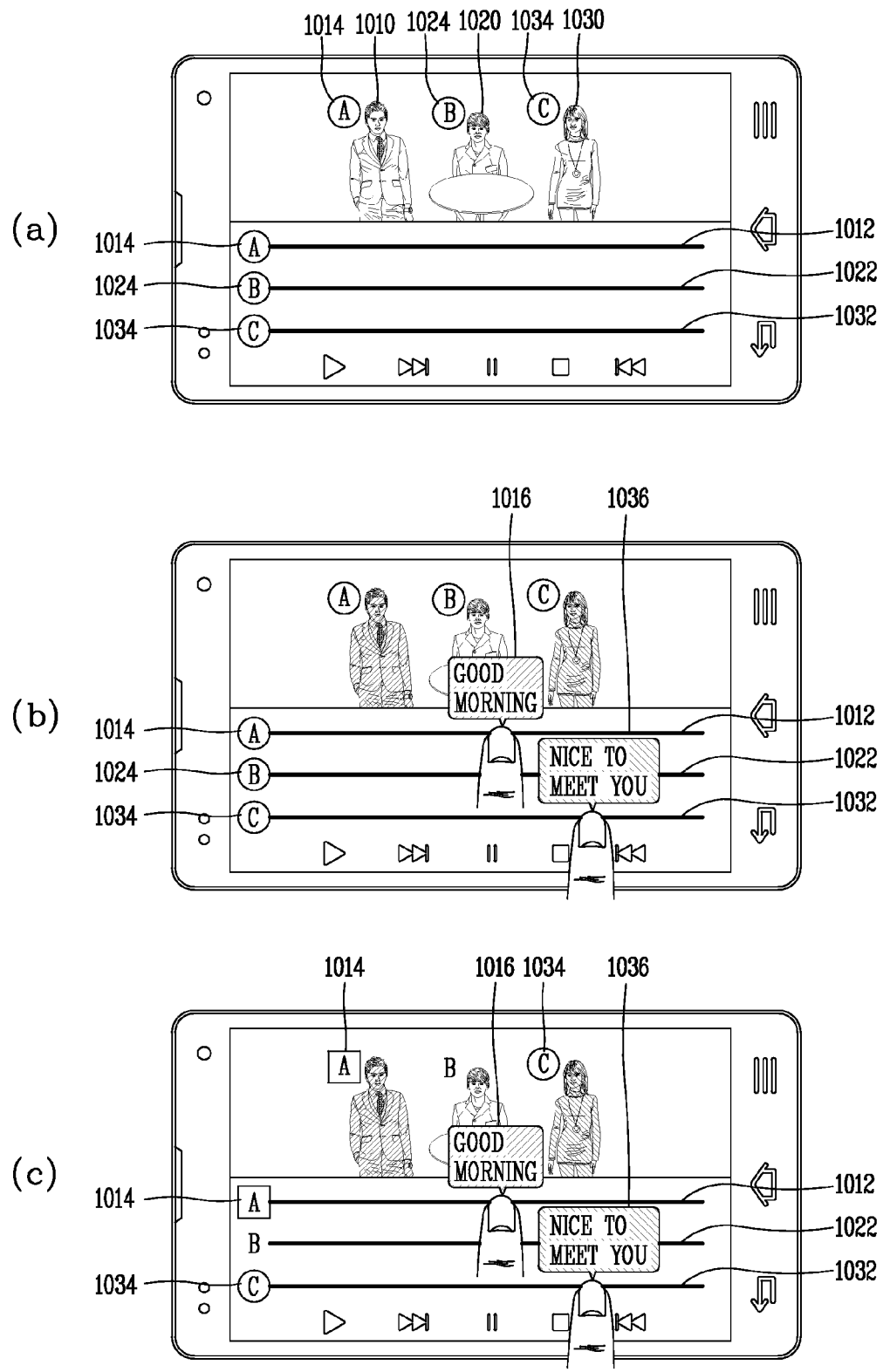
Figure 11:
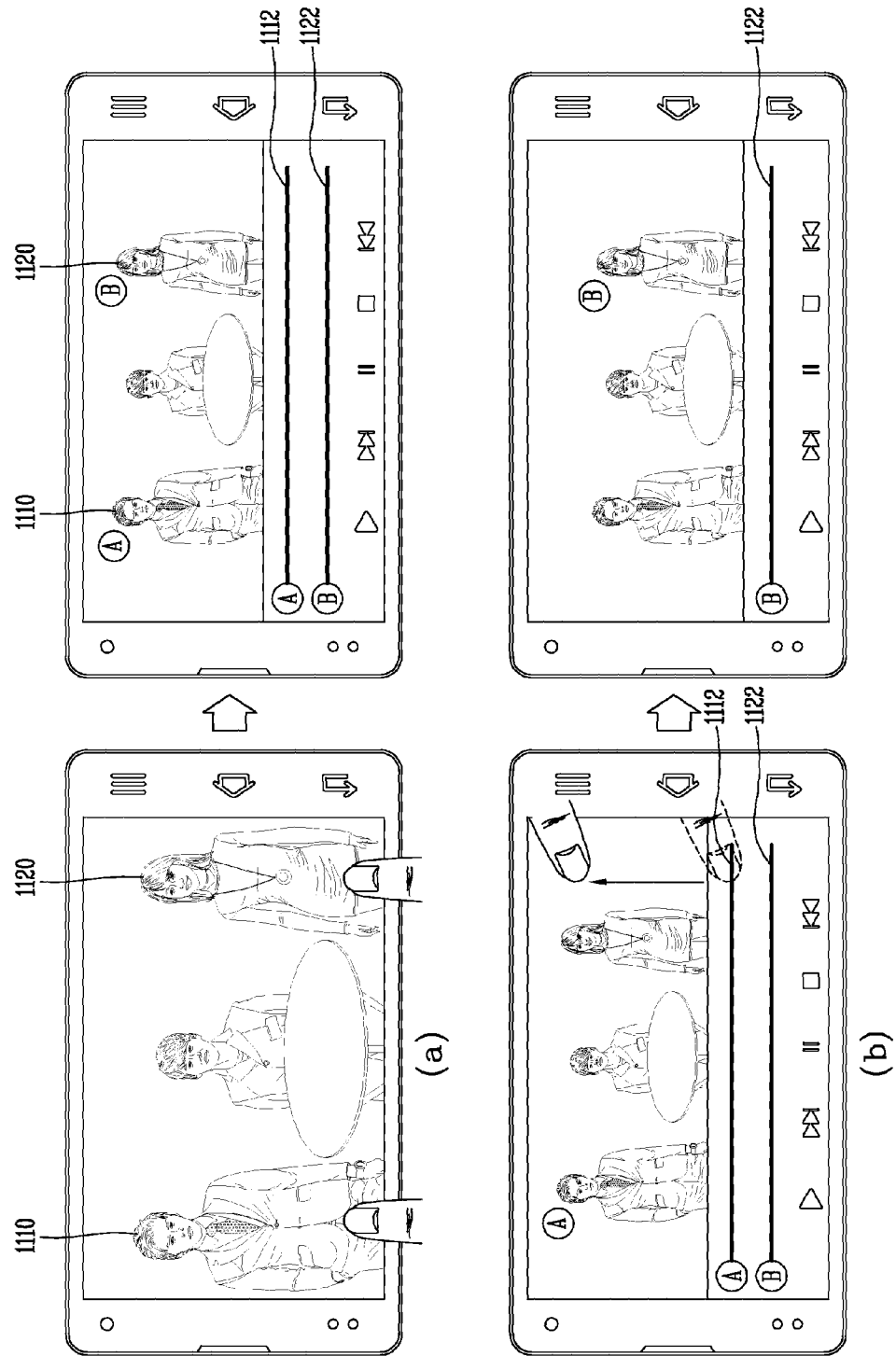
Figure 12:
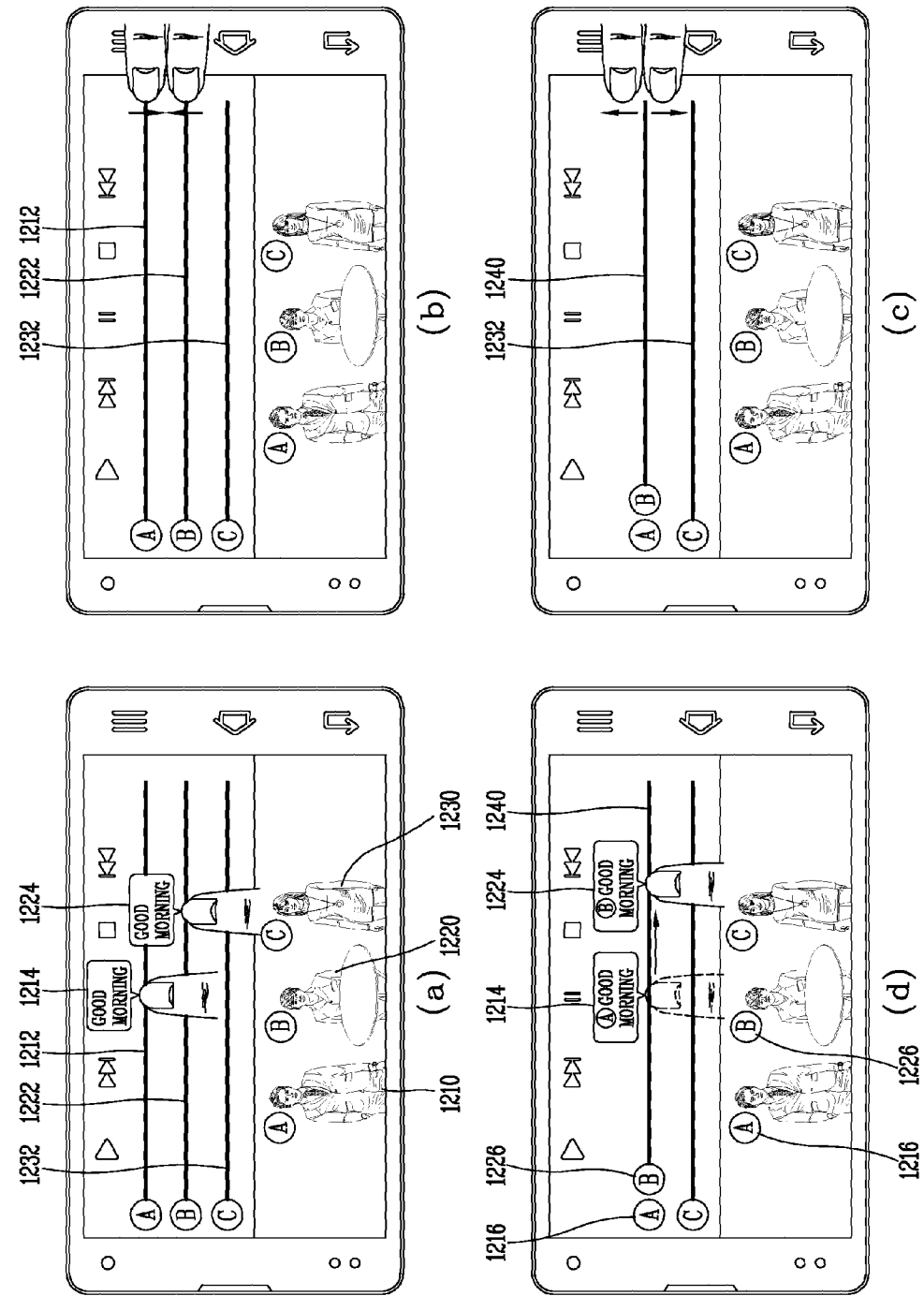
Figure 13:
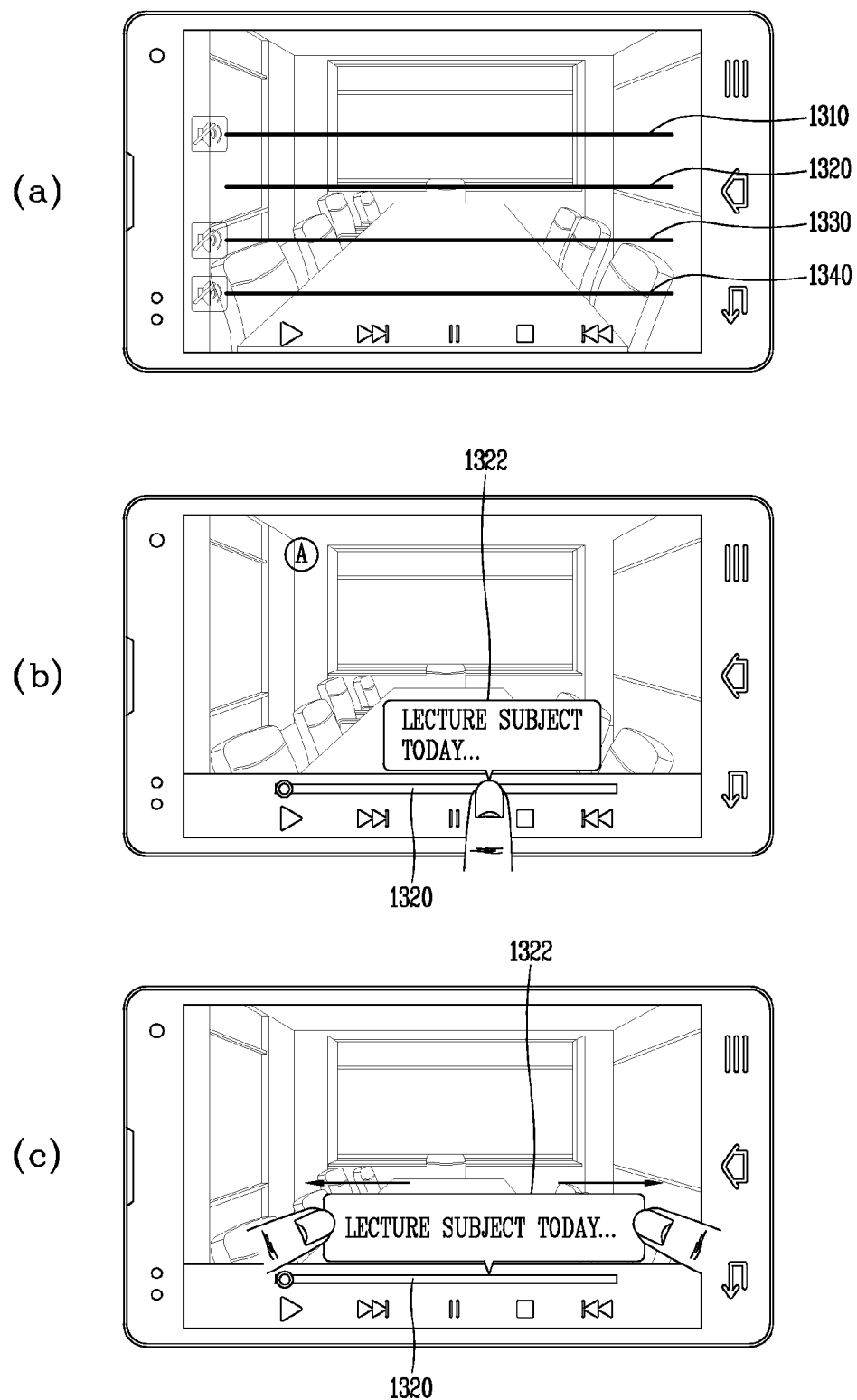
Figure 15:
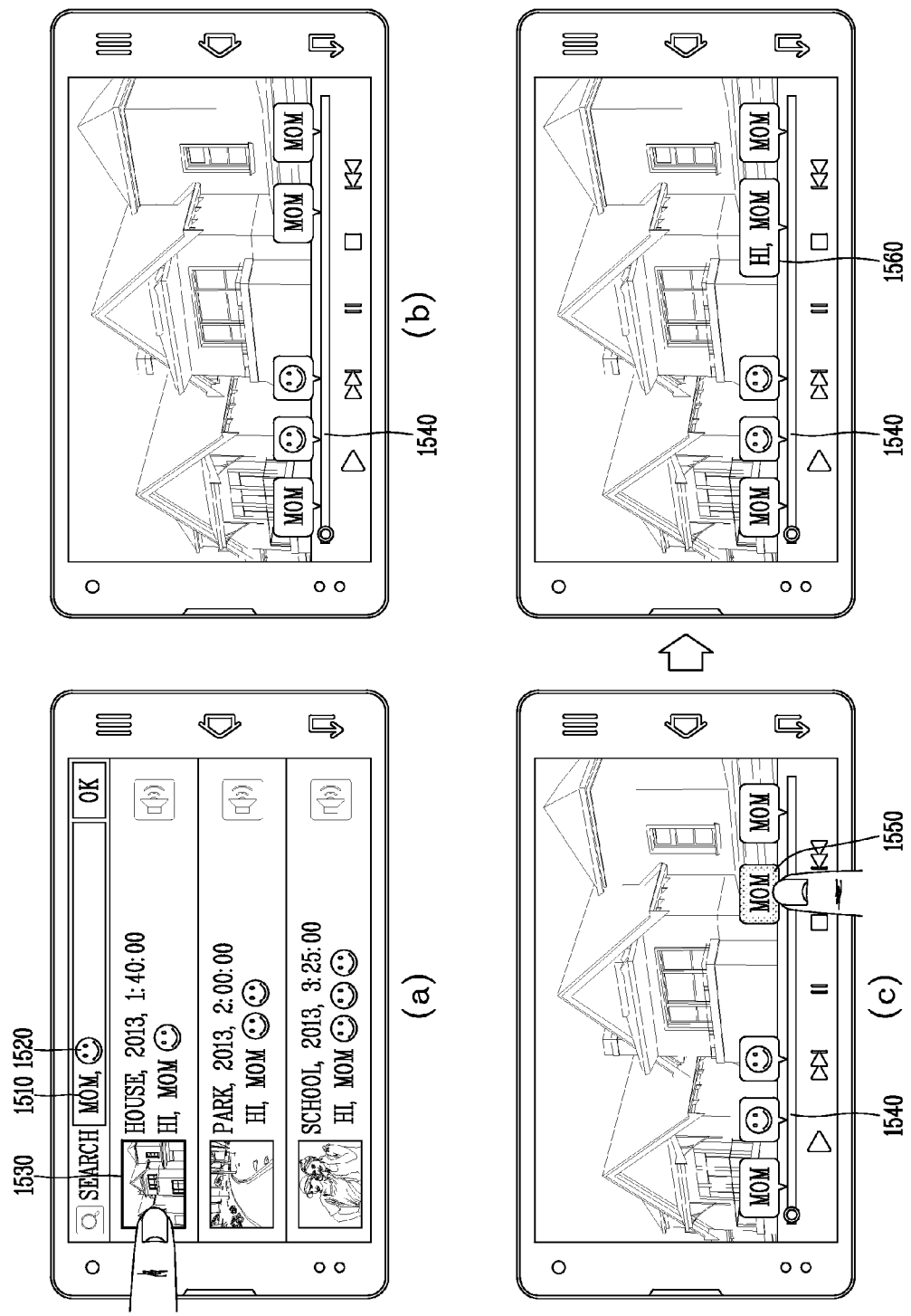

Next, FIGS. 10(a)-13(c) are display screens illustrating embodiments of the user interface by which the items of video information corresponding to the multiple audio information, respectively, are output. Referring to FIG. 10(a), if audio information is input from multiple speakers 1010, 1020, and 1030, then audio bars 1012, 1022, and 1032 are output by which the voices of the speakers are searched for, as a result of the audio information corresponding to the multiple speakers 1010, 1020, and 1030 being output, respectively.

Specifically, objects 1014, 1024, and 1034 that represent the speakers 1010, 1020, 1030 are output on audio bars 1012, 1022, 1032 by which the speakers 1010, 1020, and 1030 and the voices of the speakers are searched for, respectively. For example, the icon 1014 indicating a speaker A (i.e., a speaker 1010) is output together on the audio bar 1012 as a result of the voice made by the speaker A being searched for.

At this point, the multiple speakers, corresponding to the respective audio bars that are output, are selected in increasing order of the decibel level of the sound that is output, or the speaker who is set in advance by the user is selected. In addition, the speaker who makes the voice at a predetermined decibel level or higher is selected.

Each audio bar may be output, for example, on a region on which a portion of the object (e.g., the speaker) to be hidden by the audio bar is minimized. In addition, the audio bar is output with a dim image effect in order to identify the audio bar and the image in the moving image together.

Referring to FIG. 10(b), when the user applies the drag input to each of audio bars 1012, 1022, and 1032, the voice that is output based on the speaker is converted into the text information and the resulting text information is output. Specifically, the user can search for items of voice-converted text information 1016 and 1036 by applying the drag input to at least one or more of the audio bars 1012 and 1032 individually or at the same time.

In addition, the images of the speakers 1010 and 1030 corresponding to the audio bars 1012 and 1032, respectively, to which the drag input is applied, are output in a highlighted manner. For example, the images of the speakers 1010 and 1030 that make the voice are output in the same colors as those of the verbal balloons 1016 and 1036 including the text information. As another embodiment, the images of the speakers 1010 and 1030 that are output from the audio bars 1012 and 1032, respectively, to which the drag input is applied, may be output in different colors and sizes.

Referring to FIG. 10(c), objects 1014 and 1034 that represent the speakers, respectively, are output in the same shape as those of the verbal balloons 1016 and 1036 including the text information. The objects 1014 and 1034 that represent the speakers, respectively, may be output, for example, in an emphasized manner. That is, the emphasized manner for the output of the icons 1014 and 1034 that represent the speakers, respectively, may be output in a larger, or an emphasized, differently colored manner.

Referring to FIG. 11(a), only the audio bar with respect to the selected speaker is output. Specifically, when images of speakers A and B (i.e., speakers 1110 and 1120) are touched on for selection, only audio bars 1112 and 1122 with respect to the speakers A and B are output. As another embodiment, after the input such as a pinch-out input is applied to the screen 151 to enlarge the screen, the image of the speaker may be touched on for selection.

Referring to FIG. 11(b), a specific audio bar is selected to make the specific audio bar disappear. Specifically, the audio bar 1112 for the speaker A is made to disappear from the screen 151 by applying the drag input to the audio bar 1112 for the speaker A outward from the inside of the screen 151 or by vertically applying the drag input to the audio bar 1112. In addition, the audio bar 1112 for the speaker A may be touched on, for example, to make the audio bar 1112 disappear from the screen 151.

Referring to FIG. 12(a), when the drag input is applied to an audio bar 1212 by which the voice made by the speaker A (i.e., speaker 1210) can be searched for, the voice made by the speaker A is converted into text information 1214 and the resulting text information 1214 is output. Likewise, when the drag input is applied to an audio bar 1222 by which the voice made by the speaker B (i.e., speaker 1220) can be searched for, the voice made by the speaker B is converted into text information 1224, and the resulting text information 1224 is output. The drag input is applied to the audio bars 1212 and 1222 at the same time or individually.

Referring to FIGS. 12(b) and 12(c), the audio bars 1212 and 1222 are output as one audio bar 1240 by applying a combining drag input to the audio bars 1212 and 1222 corresponding to the speakers A and B, respectively. In the same manner, the audio bar 1240 that results from the combination is separated back into the multiple auto bars 1212 and 1222 by applying a separating drag input to the audio bar 1240. That is, a state in FIG. 12(c) is returned back to a state in FIG. 12(b).

As another embodiment, an editing mode in which the audio bar can be edited may be entered, and the multiple audio bars that are intended to be combined may be touched on for selection. Accordingly, one audio bar is output that corresponds to the selected multiple audio bars.

As a specific embodiment, when the user touches on the audio bar 1222 for the speaker B and an audio bar 1232 for a speaker C in the editing mode, the audio bar 1222 for the speaker B and the audio bar 1232 for the speaker C may be output as one audio bar. At this point, the user can combine two or more audio bars into one audio bar.

Referring to FIG. 12(d), when the drag input is applied to the audio bar 1240 that results from the combination as illustrated in FIG. 12(c), the items of text information 1214 and 1224 that are output to the audio bars, respectively, as illustrated in FIG. 12(a), are output to one audio bar. As an embodiment, objects 1216 and 1226, each indicating the speaker, may be displayed together with the items of text information 1214 and 1224.

As another embodiment, only the voice may be output that corresponds to the greatest-decibel one of the voices corresponding to the audio bar that results from the combination. In addition, only the text information is output that corresponds to the voice selected by the user.

Referring to FIG. 13(a), audio bars 1310, 1320, 1330, and 1340 corresponding to multiple sounds being detected, respectively, are output. At this point, the user can search for only the desired sound by muting the audio bars 1310, 1330, and 1340 that he or she does not desire to use during searching. For example, in the editing mode, the user can touch on and select the audio bars 1310, 1330, and 1340 that he or she desires to mute.

Referring to FIG. 13(b), only the audio bar 1320 selected as not being muted by the user is output, and the user can apply the drag input to the selected audio bar 1320. Accordingly, text information 1322 corresponding to the selected audio information is output on the audio bar 1320.

Referring to FIG. 13(c), the text information 1322 and the voice corresponding to the text information 1322 are output together. At this point, the user can increase a size of the verbal balloon 1322 by applying the pinch-put input to the verbal balloon 1322 including the text information. In addition, as the size of the verbal balloon 1332 is increased, sizes of letters in the text information included in the verbal balloon 1332 are increased. Accordingly, an amount of voice to be output is increased. The user can also input the video information corresponding to the audio information for which he or she desires to search and thus can detect a list of moving images including such audio information.

Next, FIGS. 14(a)-15(c) are diagrams illustrating embodiments of the user interface by which the moving image including the audio information is searched for. Referring to FIG. 14(a), when a voice to be searched for is input as text information 1410, the list of moving images including the text information 1410 that is input, as the voice, is output in the form of a thumbnail.

Specifically, entire sentences 1420 and 1430, each including the text information 1410 that is input, is output on each of the list of moving images. In addition, when the user touches on a thumbnail 1440 of the moving image, the segment is played back that includes the text information that is present in the corresponding moving image. In addition, when the user touches on an audio button 1450, the voice that is present in the moving image including the text information is output.

Referring to FIG. 14(b), when an emoticon to be searched for is input, the list of moving images including audio information corresponding to the emoticon that is input is output in the form of a thumbnail. For example, when the user inputs an emoticon 1460 depicting a smiling expression, the list of moving images including a laughing sound is output in the form of a thumbnail. Similar to FIG. 14(a), when the user touches on a thumbnail 1470 of the moving image, the corresponding moving image is played back beginning with the segment including the laughing sound. In addition, when the user touches on an audio button 1480, only the laughing sound included in the corresponding moving image is heard in advance.

If the number of segments, each including the audio information corresponding to the text information that is input, or the audio information corresponding to the emoticon, is two or more in the moving image, for example, the multiple items of text information or the multiple emoticons that correspond to the segments, respectively, are output. Accordingly, as illustrated in FIG. 14(b), multiple emoticons 1490 corresponding to two segments, respectively, in each of which the laughing sound is present, are output on the list of moving images.

Referring to FIG. 15(a), text information 1510 corresponding to a voice to be searched for, and an emoticon 1520 are input together. Accordingly, the list of moving images including a sound corresponding to the text information 1510 and the emoticon 1520 that are input is output in the form of a thumbnail.

Referring to FIG. 15(b), when in FIG. 15(a), the user touches on one thumbnail 1530 of the thumbnails that are output to select the touched one thumbnail 1530, a search bar 1540 is output that corresponds to the point in time for the playback of the moving image corresponding to the selected one thumbnail 1530.

Specifically, the text information 1510 and the emoticons 1520 are output on the positions of the audio bar 1540, which correspond to the points in time for the playback of the moving image, from which the sounds corresponding to the text information 1510 and the emoticon 1520 that are input are output, respectively. At this point, the time for the playback of the moving image, corresponding to each of the text information 1510 and the emoticon 1520 is displayed together with the audio bar 1540.

Referring to FIG. 15(c), when in FIG. 15(b), the user touches on at least one item of text information 1550 of the corresponding items of text information, an entire sentence 1560 in the moving image, including the corresponding text information, is output. In addition, when the entire sentence 1560 is again touched on, the moving image is played back beginning with the segment from which the entire sentence 1560 is output.

According to embodiments of the present invention, the voice in the moving image is output as the text information, and thus the desired scene is searched for speedily and precisely. In addition, when the speaker who makes the voice-converted text information is focused and output, or when the speed at which the touch input is applied to the search bar is fast, only the keyword in the voice-converted text information is provided. Accordingly, the visual recognition of the scenes in the moving image can be improved.

Then, the desired scene can be searched for speedily and simply without playing back the moving image, and the voice-based moving image search is possible in which only the desired voice among the multiple voices is selected and searched for. As a result, the user convenience can be improved.

In addition, according to one embodiment disclosed in the present specification, the method described above may be realized by being stored as processor-readable codes in a program-stored medium. A ROM, a RAM, a CD-ROM, a magnetic tape, a floppy disk, an optical data storage device and the like are examples of the processor-readable medium, and the processor-readable medium may be realized in the form of a carrier wave (e.g., a transmission over the Internet).

The foregoing embodiments and advantages are merely exemplary and are not to be considered as limiting the present invention. The present teachings can be readily applied to other types of apparatuses. This description is intended to be illustrative, and not limited to the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a display unit configured to display a moving image and a search bar that adjusts a point in time for playback of the moving image, wherein positions of the search bar correspond to points in time for playback of the moving image, respectively; and
   a controller configured to:
   detect a touch input applied to a position of the search bar,
   select a point in time for the playback of the moving image corresponding to the position of the touch input in response to the detection of the touch input applied to the search bar,
   convert audio information that is output from the selected point in time for the playback of the moving image into text information,
   display, on the display unit, a scene image of the moving image corresponding to the selected point in time together with the text information while maintaining the touch input, and
   in response to dragging the touch input to another position of the search bar, change the displayed scene image and the text information into another scene image of the moving image corresponding to the changed point in time and another text information corresponding to audio information that is output from the changed point in time while dragging the touch input,
   wherein the text information is displayed on a selected position of the search bar that corresponds to the selected point in time or the changed point in time for the playback of the moving image,
   wherein the controller adjusts a size of the text information based on a speed of the dragging applied on the search bar for increasing readability,
   wherein an image including the text information is differently displayed based on a characteristic of the audio information that is output from the selected point in time or the changed point in time while dragging the touch input, and
   wherein the characteristic of the audio information includes an amount of voice and/or a voice tone of the audio information corresponding to the text information.

2. The mobile terminal of claim 1, wherein the controller is further configured to display a keyword in the text information corresponding to the converted text information depending on the speed of the dragging applied on the search bar.

3. The mobile terminal of claim 1, wherein the controller is further configured to enter a search mode when the touch input is applied to the search bar.

4. The mobile terminal of claim 1, wherein the controller is further configured to display multiple audio bars corresponding to multiple audio information input when playing back the moving image, respectively, and
   wherein, with respect to each of the audio bars, the controller outputs items of text information corresponding to items of audio information that are output from the selected point in time for the playback of the moving image, on positions of the audio bar corresponding to the points in time for the playback, respectively.

5. The mobile terminal of claim 1, wherein when the speed of the dragging applied on the search bar exceeds a predetermined speed, the controller converts a part of the audio information into the text information and displays the resulting part of the text information.

6. A method of controlling a mobile terminal, the method comprising:
   displaying, on a display unit of the mobile terminal, a moving image and a search bar that adjusts a point in time for playback of the moving image, wherein positions of the search bar correspond to points in time for playback of the moving image, respectively;
   detecting a touch input applied to a position of the displayed search bar;
   selecting a point in time for the playback of the moving image corresponding to the position of the touch input in response to the detection of the drag input applied to the search bar;
   converting audio information that is output from the selected point in time for the playback of the moving image into text information;
   displaying together with a scene image of the moving image corresponding to the selected point in time and the text information while maintaining the touch input; and
   in response to dragging the touch input to another position of the search bar, changing the displayed scene image and the text information into another scene image of the moving image corresponding to the changed point in time and another text information corresponding to audio information that is output from the changed point in time while dragging the touch input,
   wherein the text information is displayed on a selected position of the search bar that corresponds to the selected point in time or the changed point in time for the playback of the moving image,
   wherein the a size of the text information is differently adjusted based on a speed of the dragging applied on the search bar for increasing readability,
   wherein an image including the text information is differently displayed based on a characteristic of the audio information that is output from the selected point in time or the changed point in time while dragging the touch input, and
   wherein the characteristic of the audio information includes an amount of voice and/or a voice tone of the audio information corresponding to the text information.

7. The method of claim 6, wherein the displaying of the text information includes displaying a keyword in the text information corresponding to the converted text information depending on the speed of the dragging applied to the search bar, on the display unit.

8. The method of claim 6, wherein, as a result of the selected point in time for the playback of the moving image being selected, a search mode is entered.

9. The method of claim 6, wherein the selecting of the point in time for the playback of the moving image includes displaying multiple audio bars corresponding to the multiple audio information that are input when playing back the moving image, respectively, and wherein the displaying of the text information includes displaying items of text information corresponding to the items of audio information that are output from the points in time for the playback, on positions of the audio bar corresponding to the points in time for the playback of the moving image, respectively, with respect to each of the audio bars.

\* \* \* \* \*